US012679372B2

(12) United States Patent
Xiao

(10) Patent No.: US 12,679,372 B2
(45) Date of Patent: Jul. 14, 2026

(54) POSITIONING METHOD AND RELATED APPARATUS

(71) Applicant: Tencent Technology (Shenzhen) Company Limited, Shenzhen (CN)

(72) Inventor: Ning Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 18/296,756

(22) Filed: Apr. 6, 2023

(65) Prior Publication Data

US 2023/0278563 A1 Sep. 7, 2023

Related U.S. Application Data

(63) Continuation of application No. PCT/CN2022/092376, filed on May 15, 2022.

(30) Foreign Application Priority Data

Jun. 9, 2021 (CN) .......................... 202110645007.9

(51) Int. Cl.
*B60W 30/18* (2012.01)
*B60W 40/06* (2012.01)
(Continued)

(52) U.S. Cl.
CPC ...... *B60W 30/18163* (2013.01); *B60W 40/06* (2013.01); *B60W 40/10* (2013.01);
(Continued)

(58) Field of Classification Search
CPC ....... B60W 2420/403; B60W 2552/10; B60W 2556/40; B60W 30/18163; B60W 40/06;
(Continued)

(56) References Cited

U.S. PATENT DOCUMENTS 10,870,446 B2 * 12/2020 Fujii ...................... B62D 6/001
2004/0107030 A1 6/2004 Nishira et al.
(Continued)

FOREIGN PATENT DOCUMENTS

CN 103085810 A 5/2013
CN 103206960 A 7/2013
(Continued)

OTHER PUBLICATIONS

Machine Translation of JP 2018151822 A obtained from Clarivate Analytics on Feb. 20, 2025 (Year: 2018).*
(Continued)

*Primary Examiner* — Naeem Taslim Alam
*Assistant Examiner* — Michael J Herrera
(74) *Attorney, Agent, or Firm* — Sughrue Mion, PLLC

(57) ABSTRACT

A positioning method and apparatus, a computer device, and a non-transitory computer-readable storage medium. The method includes: determining a first target lane where a target vehicle is located based on the target vehicle reaching a first position in a target area on a road, the target area comprising the first position and a second position, a first quantity of lanes included at the first position being different from a second quantity of lanes included at the second position, the first position being a start position in the target area, and the second position being an end position in the target area, acquiring vehicle motion data of the target vehicle in the target area and road condition image data, and determining a second target lane where the target vehicle is located before leaving the second position according to the vehicle motion data, the road condition image data, and the first target.

16 Claims, 15 Drawing Sheets

(51) Int. Cl.
  *B60W 40/10* (2012.01)
  *G06V 20/56* (2022.01)
(52) U.S. Cl.
  CPC ..... *G06V 20/588* (2022.01); *B60W 2420/403*
  (2013.01); *B60W 2552/10* (2020.02); *B60W*
  *2556/40* (2020.02)
(58) Field of Classification Search
  CPC .............. B60W 40/10; G01C 21/3492; G01C
  21/3658; G06V 20/56; G06V 20/588
  See application file for complete search history.

(56) References Cited

U.S. PATENT DOCUMENTS

| | | | | |
|---|---|---|---|---|
| 2010/0308988 | A1* | 12/2010 | Ieda | B60Q 1/40 |
| | | | | 340/477 |
| 2016/0314358 | A1* | 10/2016 | Kushida | B60W 30/12 |
| 2017/0116477 | A1 | 4/2017 | Chen et al. | |
| 2020/0184809 | A1* | 6/2020 | Lee | G08G 1/096861 |
| 2021/0269038 | A1* | 9/2021 | Lu | G08G 1/167 |
| 2022/0063657 | A1* | 3/2022 | Kashu | B60W 60/0055 |
| 2022/0118971 | A1* | 4/2022 | Fujii | B60W 30/0953 |
| 2024/0166210 | A1* | 5/2024 | Kato | B60W 30/18163 |
| 2024/0174227 | A1* | 5/2024 | Nimura | G08G 1/143 |
| 2024/0262351 | A1* | 8/2024 | Taniguchi | B60W 50/14 |

FOREIGN PATENT DOCUMENTS

| | | | | |
|---|---|---|---|---|
| CN | 106056100 | A | | 10/2016 |
| CN | 109552333 | A | | 4/2019 |
| CN | 111311902 | A | | 6/2020 |
| DE | 112014000658 | T5 | | 10/2015 |
| JP | 2003-044978 | A | | 2/2003 |
| JP | 2018151822 | A | * | 9/2018 |
| TW | I719663 | B | * | 2/2021 |

OTHER PUBLICATIONS

Machine Translation of TW I719663 B obtained from Clarivate Analytics on Dec. 13, 2025 (Year: 2021).*
International Search Report for PCT/CN2022/092376 dated Aug. 10, 2022.
Written Opinion for PCT/CN2022/092376 dated Aug. 10, 2022.
Extended European Search Report dated Jul. 26, 2024 in Application No. 22819293.6.
Translation of Written Opinion for PCT/CN2022/092376 dated Aug. 10, 2022.
Communication dated Nov. 28, 2024, issued in Chinese Application No. 202110645007.9.

\* cited by examiner

Determine a first target lane where a target vehicle is located in a case that the target vehicle reaches a first position in a target area on a road — S201

Acquire vehicle motion data of the target vehicle in the target area, and road condition image data — S202

Determine a second target lane where the target vehicle is located before leaving the second position according to the vehicle motion data, the road condition image data, and the first target lane — S203

FIG. 2

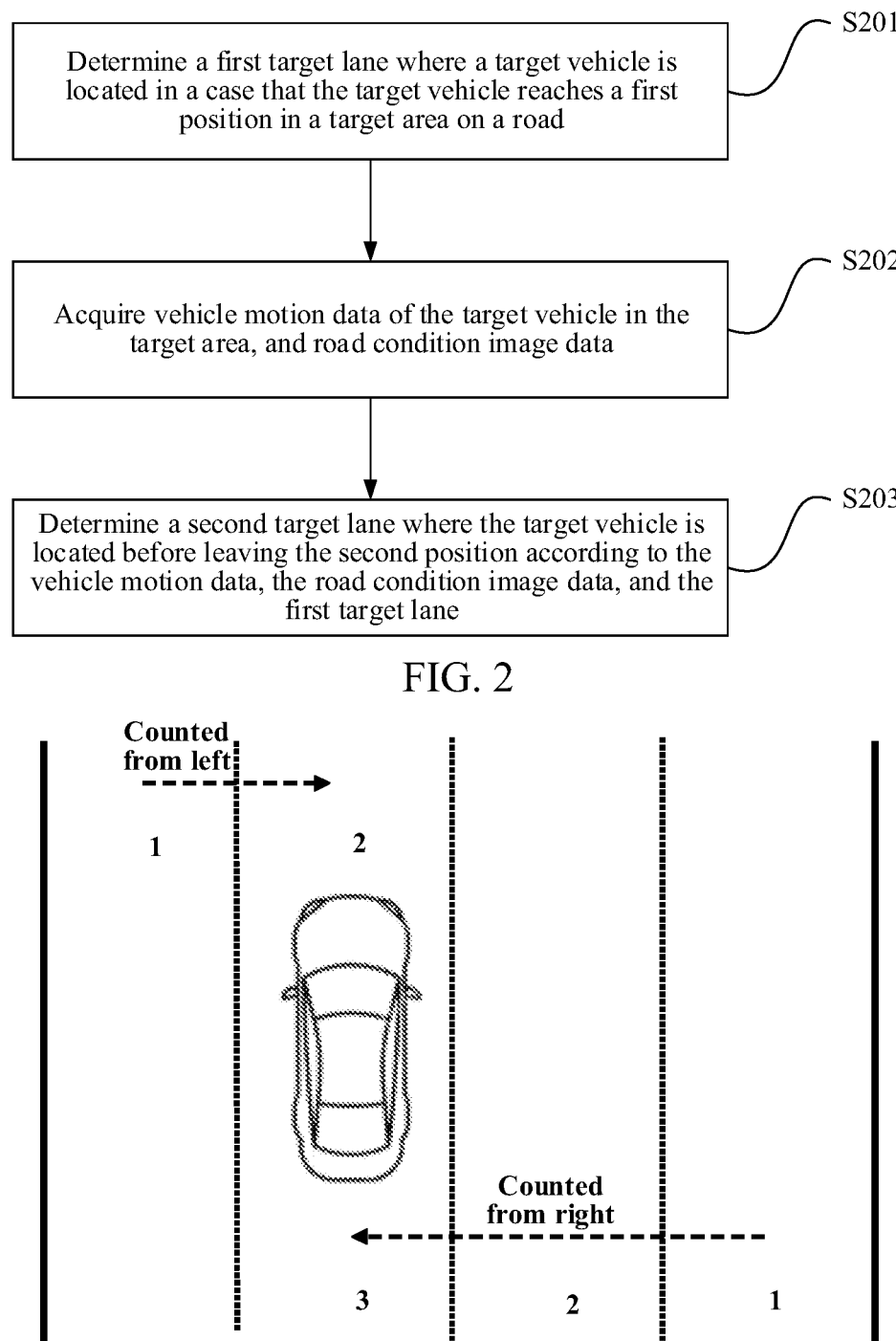

Counted from left 1    2

Counted from right 3    2    1

FIG. 3

Lane line disappearance

POSITIONING METHOD AND RELATED APPARATUS

CROSS-REFERENCE TO RELATED APPLICATION(S)

This application is a continuation application of International Application No. PCT/CN2022/092376, filed May 12, 2022, which claims priority to Chinese Patent Application No. 202110645007.9, filed on Jun. 9, 2021, the disclosures of which are herein incorporated by reference in their entireties.

FIELD

The disclosure relates to the technical field of vehicle driving, in particular to a positioning technology.

BACKGROUND

The use of a map function is very common in people's daily life. For example, people plan a driving route, and remind a driver whether an illegal driving behavior occurs through software or a system including a function such as a map. When applying such kind of map function, accurate positioning of a vehicle is required.

In the related art, devices such as a sensor, a laser radar and a high-grade, high-precision and advanced map are usually used to achieve precise positioning of a lane where a vehicle is located. However, these devices are expensive; and some of them require complicated road reconstruction of existing roads and are difficult to be put into use on a large scale.

SUMMARY

Embodiments of the disclosure provides a positioning method and a related apparatus, a device, a computer-readable storage medium, and a computer program product, which can combine vehicle motion data and road condition image data to position a lane where a vehicle is located, so as to improve accuracy of positioning.

Some embodiments provide a positioning method performed by a computer device, the method including:

determining a first target lane where a target vehicle is located based on the target vehicle reaching a first position in a target area on a road; the target area including the first position and a second position; a first quantity of lanes included at the first position being different from a second quantity of lanes included at the second position; the first position being a start position in the target area in a driving direction of the target vehicle; and the second position being an end position in the target area in the driving direction of the target vehicle;

acquiring vehicle motion data of the target vehicle in the target area, and road condition image data; and determining a second target lane where the target vehicle is located before leaving the second position according to the vehicle motion data, the road condition image data, and the first target lane.

Some embodiments provide a positioning apparatus, the apparatus includes:

at least one memory configured to store program code; and at least one processor configured to read the program code and operate as instructed by the program code, the program code including:

first determining code configured to cause the at least one processor to determine a first target lane where a target vehicle is located based on the target vehicle reaching a first position in a target area on a road; the target area including the first position and a second position; a first quantity of lanes included at the first position being different from a second quantity of lanes included at the second position; the first position being a start position in the target area in a driving direction of the target vehicle; and the second position being an end position in the target area in the driving direction of the target vehicle;

first obtaining code configured to cause the at least one processor to acquire vehicle motion data of the target vehicle in the target area, and road condition image data; and second determining code configured to cause the at least one processor to determine a second target lane where the target vehicle is located before leaving the second position according to the vehicle motion data, the road condition image data, and the first target lane.

Some embodiments provide a computer device, the device including a processor and a memory:

the memory is configured to store a program code and transmit the program code to the processor; and the processor is configured to perform the positioning method in the first aspect according to an instruction in the program code.

Some embodiments provide a non-transitory computer-readable storage medium storing computer program that when executed by at least one processor causes the at least one processor to: perform the positioning method in the first aspect.

Some embodiments provide a computer program product, including instructions which, when driving on a computer, cause the computer to perform the positioning method in the first aspect.

BRIEF DESCRIPTION OF THE DRAWINGS

To describe the technical solutions of the embodiments of the disclosure more clearly, the following briefly introduces the accompanying drawings required for describing the embodiments. Apparently, the accompanying drawings in the following description show only some embodiments of the disclosure, and a person of ordinary skill in the art may still derive other accompanying drawings from these accompanying drawings without creative efforts.

FIG. 2 is a flowchart of a positioning method provided by an embodiment of the disclosure;

FIG. 3 is a schematic diagram of determining a first target lane provided by an embodiment of the disclosure;

DETAILED DESCRIPTION

Figure 1:
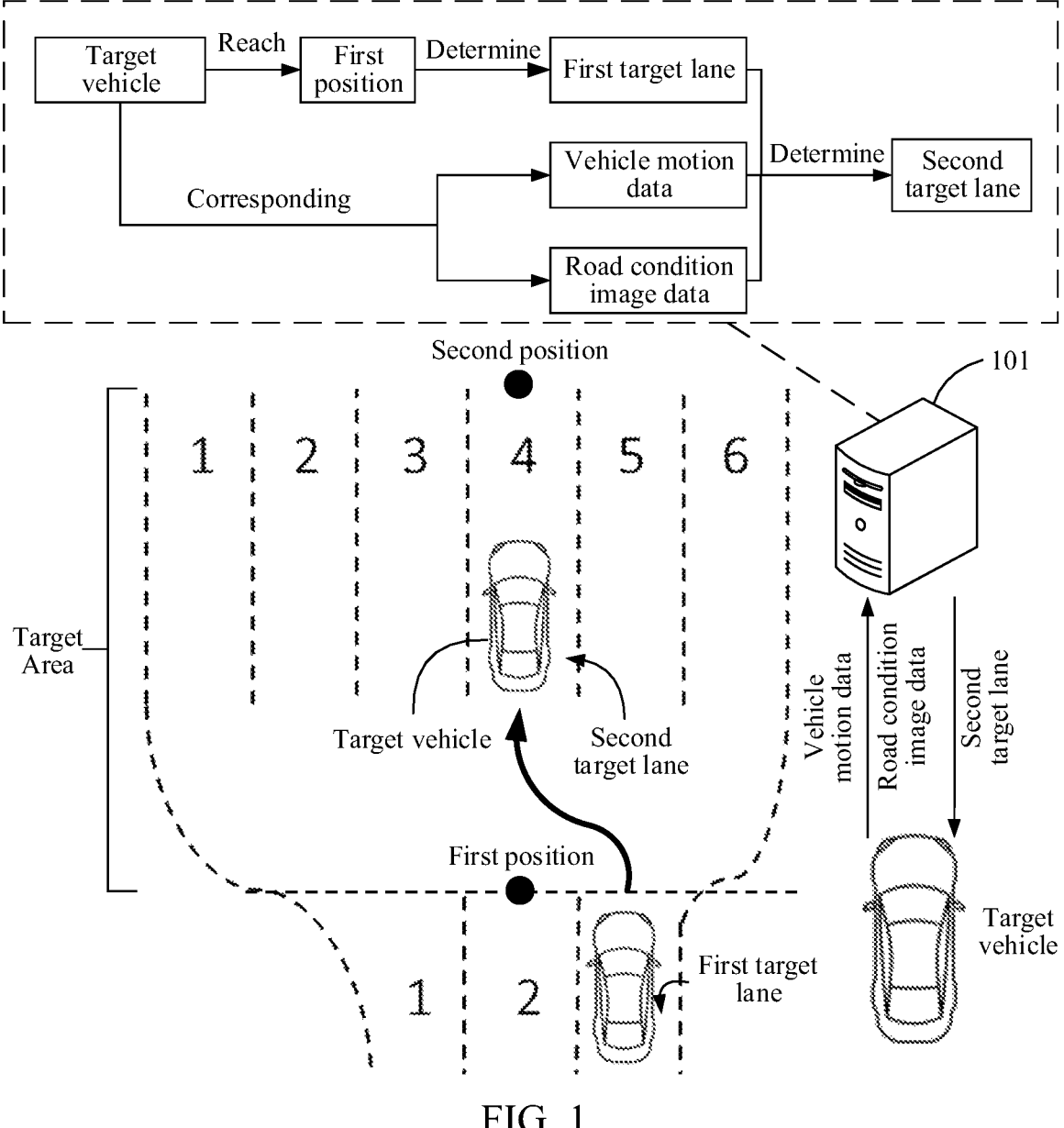
FIG. 1 is a schematic diagram of a positioning method in a practical application scenario provided by an embodiment of the disclosure.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In addition, the described features, structures or characteristics may be combined in one or more embodiments in any appropriate manner. In the following description, many specific details are provided to give a full understanding for the embodiments of the disclosure. However, a person skilled in the art will notice that, the technical solutions of the disclosure can be implemented without one or more of the following specific details, or the technical solutions of the disclosure can be implemented by using other methods, components, apparatuses, and operations/steps. In other cases, well-known methods, apparatuses, implementations, or operations are not shown or described in detail, to avoid obscuring the aspects of the disclosure.

In one or more embodiments, accurate and timely positioning of the lane can be achieved by acquiring the vehicle motion data and the road condition image data of the target vehicle before the target vehicle leaves the target area. In addition, the vehicle motion data and the road condition image data can be directly acquired by conventional on board equipment without additional cost, so that the positioning cost is reduced on the premise of ensuring accurate positioning of the lane where the vehicle is located in real time.

Precise positioning of a lane where a vehicle is located is the basis for a variety of related technologies to be well applied. For example, effective vehicle navigation can only be achieved in a case that the lane where the vehicle is located can be positioned relatively accurately. In the field of map navigation, lane-level real-time positioning is of great significance for determining an own position where the vehicle is located and making navigation strategies. In addition, route planning and guidance at a lane level can also be performed based on results of lane-level real-time positioning. Precise lane-level real-time positioning is also beneficial to improve a vehicle traffic rate of an existing road network to alleviate traffic congestion, and can also, on the other hand, ensure safe driving of vehicles and reduce an incidence rate of traffic accidents.

Of the related art, most of the technologies capable of precisely positioning the lane where the vehicle is located require the high technical cost. Some manners of positioning the lane where the vehicle is located are low in implementation cost. For example, based on acquiring visual images of the peripheries of the vehicle, the lane where the vehicle is located is positioned.

However, such manner of positioning the lane where the vehicle is located based on a visual image usually depends on a lane line in the lane. In a case that there is a change in the quantity of lanes on a road where the vehicle is located, there is a high possibility that the lane line will disappear on the road. In addition, there is a possibility that lane line information cannot be collected in various situations, such as a large number of vehicles stopping at an intersection at the same time, traffic congestion, and the like. Hence, there is a possibility that the lane where the vehicle is located cannot be accurately positioned based on the visual image.

In order to solve the above-mentioned technical problems, the disclosure provides a positioning method. In the method, a processing device can combine vehicle motion data and road condition image data to position the lane where a vehicle is located. By complementing multi-dimensional data, a problem of a relatively low positioning accuracy based on single-dimensional data due to a change in the quantity of lanes is avoided; and meanwhile, based on the easily collected multi-dimensional data, the cost of lane positioning can be reduced as much as possible under the premise of ensuring the positioning accuracy, which is helpful to implementation and promotion of the method.

It is understood that the method may be applied to a lane positioning device, which is a processing device with a positioning function. The processing device may in particular be a computer device, for example a terminal device or a server with a positioning function. The method may be executed independently by the terminal device or the server, and may also be applied to a network scenario where the terminal device communicates with the server, and is executed collaboratively through cooperation between the terminal device and the server. The terminal device may be a mobile phone, a desktop computer, a Personal Digital Assistant (PDA), a tablet computer, an on board device, and the like. The server may be an application server or a Web server. When being actually deployed, the server may be an independent physical server or a server cluster or distributed system composed of multiple physical servers. The terminal device and the server may be directly or indirectly connected via a wired or wireless communication manner; and the disclosure is not limited thereto.

In order to facilitate understanding of the technical solution provided by the embodiments of the disclosure, a positioning method provided by the embodiments of the disclosure will be described in conjunction with a practical application scenario.

FIG. 1 is a schematic diagram of a positioning method in a practical application scenario provided by an embodiment of the disclosure; and in the practical application scenario, a processing device may be a server 101. In a lane scenario shown in the lower left of FIG. 1, there is a target area, which is an area where there is a change in the quantity of lanes. As shown in the diagram, the target area includes 3 lanes at a start position and 6 lanes at an end position. Since the quantity of lanes is changed, only visual image data is used to position a lane where a vehicle is located. There may be a problem that a positioning result is not accurate enough.

In order to improve the positioning accuracy for the lane where the vehicle is located and at the same time control the cost required for positioning the lane where the vehicle is located, the server 101 may realize comprehensive positioning of the lane where the vehicle is located based on collecting data in multiple dimensions with relatively low cost. First, the server 101 may determine whether the target vehicle reaches a first position, which is a start position in the target area in a driving direction of the target vehicle. If so, it is determined that the target vehicle has started entering the target area, at which time the server may determine a first target lane where the target vehicle is located in the road. As shown in the diagram, the first target lane may be a third lane.

The server 101 may acquire vehicle motion data of the target vehicle in the target area and road condition image data of the target area. The data may indicate lane change situations of the target vehicle in the target area from the two dimensions including vehicle motion and a road condition image. The vehicle motion data is data that may be acquired based on motion of the vehicle itself, without taking an external environment as a reference. Therefore, the data is less affected by a lane environment, but also lacks reliability because of no reference to the external environment; and the road condition image data is mainly acquired based on the lane environment; although the data is easy to be affected by the complicated lane environment, the lane change situation of the target vehicle may be indicated more intuitively. Therefore, complementation between advantages and disadvantages of the data may be achieved through the data of the two dimensions.

For example, in a part where a lane line disappears in the target area, the acquired road condition image data may not accurately indicate the lane line information; and the accuracy of the lane change situation determined based on the road condition image data may be low; and since the vehicle motion data is collected without depending on the lane line, the lane change situation determined based on the vehicle motion data may have higher accuracy at this time; and the server 101 may perform data complementation on the road condition image data based on the vehicle motion data at this time.

The server 101 may integrate the vehicle motion data and the road condition image data to determine the lane change situation of the target vehicle in the target area, and by combining the first target lane and the lane change situation, may determine a second target lane where the target vehicle is located before the target vehicle leaves a second position, the second position being an end position of the target vehicle in the target area in a driving direction. As shown in FIG. 1, the second target lane may be a fourth lane. Compared with manners such as a laser radar, a sensor and a high-precision map, acquisition cost of the vehicle motion data and road condition image data is lower, so the positioning method may reduce the difficulty of implementation of the method while ensuring accurate positioning of the lane where the vehicle is located, and is easy to use and promote.

A positioning method provided by the embodiments of the disclosure will be described in conjunction with accompanying drawings.

FIG. 2 is a flowchart of a positioning method provided by an embodiment of the disclosure. The method includes the following operations.

S201: Determine a first target lane where a target vehicle is located in a case that the target vehicle reaches a first position in a target area on a road.

In order to reduce the cost of positioning the lane where the vehicle is located in real time, while ensuring the positioning accuracy, in the embodiments of the disclosure, use of high-cost technologies (such as a high-precision map, carrier wave measurement, laser radar, and the like.) can be reduced; and some technologies with less difficulty in implementation and the lower cost can be used instead to position the lane where the vehicle is located.

However, these low-cost technologies may have some problems, such as relatively simple data collection, low positioning accuracy and a high interference probability; and it can be difficult to realize accurate real-time positioning of the lane where the vehicle is located in some complicated driving scenarios. For example, in lane positioning of the target vehicle based on an image acquisition technology, it is necessary to depend on the position of a lane line in an acquired image. However, in a case that the lane line disappears on the road where the vehicle is located or the lane line cannot be photographed due to vehicle congestion, it may not be possible to accurately position the lane where the vehicle is located only by depending on the image acquisition technology.

In order to solve the above-mentioned problem, in the embodiments of the disclosure, the processing device may further add data capable of positioning other dimensions of the lane where the vehicle is located without depending on the image on the basis of dimensions of the image data, so as to realize complementation between the multi-dimensional data and improve the accuracy of lane-level real-time positioning.

Figures 10, 11:
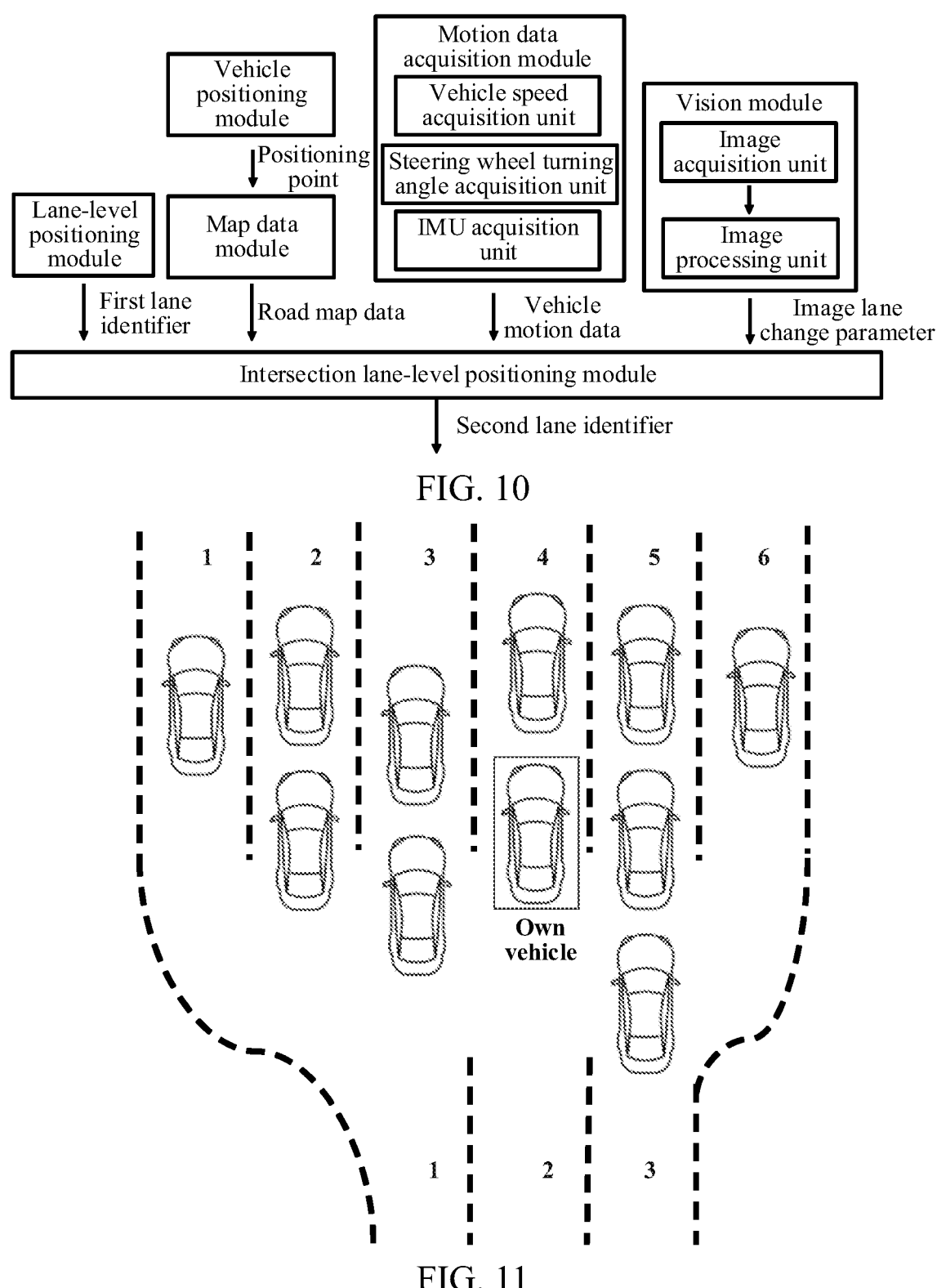
FIG. 10 is an architecture diagram of an on board terminal capable of lane-level real-time positioning provided by an embodiment of the disclosure.
FIG. 11 is a schematic diagram of a lane situation provided by an embodiment of the disclosure.

The processing device may set a target area, which is an area where it is difficult to accurately achieve lane-level real-time positioning by performing visual position only based on the image data. For example, the area is an area where some road changes are complicated; and it is easy to cause vehicle congestion. In a real situation, such an area is usually accompanied by a change in the quantity of lanes; and because of the difference in the quantity of lanes before and after the change, there is a high probability that a problem of lane line disappearance will occur. The situation where the quantity of lanes changes usually occurs at an intersection where multi-directional vehicle traffic is supported. A situation of vehicle congestion is often caused due to waiting for traffic at the intersection. All the situations tend to lead to a problem of inaccurate visual positioning. FIG. 11 is a schematic diagram of a lane situation provided by an embodiment of the disclosure. Since the vehicle is surrounded by a plurality of vehicles, it may be difficult to accurately position the lane where the vehicle is located based on a lane image around the vehicle body. Based on this, the embodiments of the disclosure may set the target area as an area where the quantity of lanes changes, so that accurate analysis can be made for these relatively complicated areas.

The processing device may determine a first target lane in the road where the target vehicle, which may be any vehicle travelling on the road, is located when the target vehicle reaches a first position; the first position is a start position of the target area on the road in the driving direction of the target vehicle; in the target area, the quantity of lanes included at the first position is different from the quantity of lanes included at the second position; and the second position is an end position of the target area in the driving direction of the target vehicle.

FIG. 3 is a schematic diagram of determining a first target lane provided by an embodiment of the disclosure. The processing device may acquire a road image in front of the target vehicle by a camera mounted on the target vehicle (for example, mounted on a windshield, a vehicle roof, or other positions), and then perform element segmentation on image data corresponding to the road image to identify information of each lane line adjacent to the target vehicle. The processing device may then perform inverse perspective transformation on each adjacent lane line, i.e. converting coordinates corresponding to each adjacent lane line from a camera coordinate system to a world coordinate system.

Further, the processing device may perform fitting reconstruction on the transformed lane line to determine the lane where the target vehicle is located in the current road, for example, the lane counted from left or right. With reference to FIG. 3, FIG. 3 shows a four-lane road scenario. Two solid lines on the left and right sides indicate road edges. For the target vehicle, the upper part of FIG. 3 shows a determination rule of lanes counted from left. From the first lane counted from left to the current lane, the determined first target lane is a second left lane; and the lower part of FIG. 3 shows a determination rule of lanes counted from right. From the first lane counted from right to the current lane, the determined first target lane is a third right lane.

In addition, the processing device may further input the acquired road image into a pre-trained neural network model using a machine learning technology for processing; and the neural network model may take the lane where the vehicle is located as an output result, for example, the lane counted from left. When the lane where the vehicle is located cannot be determined in the above manner, a result of 0 may be output.

In order to further improve the accuracy of the first target lane, the processing device may perform filtering processing, such as a median filtering processing or the like, on a determination result of the first target lane by a certain rule or method so as to effectively reduce jitter of a lane positioning result.

S202: Acquire vehicle motion data of the target vehicle in the target area, and road condition image data.

In order to make up for deficiency of visual positioning, the processing device may integrate other dimension data which does not need to depend on visual images for positioning, and jointly position the lane where the vehicle is located in real time. The processing device may acquire vehicle motion data of the target vehicle in the target area and road condition image data; the vehicle motion data can reflect a displacement situation of the target vehicle in the target area from the angle of own motion of the vehicle; and the road condition image data can reflect the displacement situation of the target vehicle in the target area from the angle of image changes around the vehicle.

Since the vehicle motion data only needs to collect own data information of the vehicle and does not need an external environment as a reference, the vehicle motion data can still reflect the relatively accurate vehicle displacement situation even in a relatively complicated lane situation, for example, in a situation such as lane line disappearance and surrounding vehicle congestion, which is not conducive to accurate analysis of the image change around the vehicle, so as to make up for the deficiency of lane positioning based on the road condition image data to a certain extent.

S203: Determine a second target lane where the target vehicle is located before leaving the second position according to the vehicle motion data, the road condition image data, and the first target lane.

Based on the vehicle motion data and the road condition image data, the processing device may analyze the displacement situation of the target vehicle in the target area from the two angles of the own motion of the vehicle and the image around the vehicle, so that the lane change situation of the target vehicle in the target area can be determined relatively accurately. Further, based on the first target lane and the lane change situation of the target vehicle in the target area identified by the vehicle motion data and the road condition image data, the processing device may relatively accurately determine a second target lane where the target vehicle is located when leaving the target area.

It is shown in the above-mentioned technical solution that the vehicle motion data can identify the vehicle displacement situation based on vehicle interior data from the angle of the vehicle itself; and the road condition image data can determine the vehicle displacement situation based on a reference of vehicle exterior data from the angle of simulating vehicle vision. In combination with complementation of a dimension of simulation of vehicle vision and a dimension of own motion of the vehicle on the angle of vehicle displacement recognition, the lane change situation of the target vehicle in such complicated environment of the target area can be accurately sketched; and then combined with the first target lane in the road when the target vehicle reaches the first position, the second target lane before the target vehicle leaves the second position can be determined, so that timely positioning of the lane can be realized. In addition, the vehicle motion data and the road condition image data may be directly acquired by conventional on board equipment without additional cost, so that the positioning cost is reduced on the premise of ensuring precise positioning of the lane where the vehicle is located in real time.

In some embodiments, in a practical process of positioning the lane where the vehicle is located, the processing device may analyze the vehicle motion data and the road condition image data in various manners. In some embodiments, since in a relatively complicated road situation, the road condition image data has a greater probability of being disturbed; the vehicle motion data is only collected based on the own motion of the vehicle; and the probability of being disturbed is smaller, the lane change situation indicated by the vehicle motion data may be more accurate than the lane change situation indicated by the road condition image data. Since the road condition image data can indicate the image condition around the vehicle, some image features which can be used for positioning the lane where the vehicle is located can be collected; and verification of the lane change situation can be realized to a certain extent based on the road condition image data.

Since the first target lane can be determined when the target vehicle reaches the first position; and the vehicle motion data and road condition image data can be acquired when the target vehicle is in the target area, it is shown that the processing device may acquire the information required for lane positioning of the target vehicle before the target vehicle leaves the second position. Thus, to achieve lane-level real-time positioning, the processing device may determine a second target lane where the target vehicle is located before leaving the second position according to the vehicle motion data, the road condition image data, and the first target lane.

In summary, the processing device may determine the lane change situation of the target vehicle based mainly on the vehicle motion data, and verify the lane change situation determined based on the vehicle motion data based on the road condition image data. The processing device may determine motion lane change parameters according to the vehicle motion data, the motion lane change parameters being configured to identify that the target vehicle does not change the lane, or a direction of a changed lane, or a quantity of changed lanes. The processing device may determine a second target lane identifier before the target vehicle leaves the second position according to the motion lane change parameters, the road condition image data and a first target lane identifier corresponding to the first target lane, the second target lane identifier being configured to identify the second target lane. In this way, the lane change situation of the target vehicle can be determined by relatively accurate data; and the analyzed lane change situation can be verified by relatively vivid image data features, so as to determine a more accurate second target lane identifier.

For example, in a case that the processing device determines, based on the vehicle motion data, that the target vehicle has made leftward lane change motion in the target area, but finds in the road condition image data that the target vehicle is actually far from a road guardrail on the left side in the driving direction, it can be determined that the lane change situation determined based on the vehicle motion data is not accurate enough.

To further improve the accuracy of lane positioning, the processing device may adopt a variety of vehicle motion data to analyze the lane change situation. In some embodiments, the vehicle motion data may include at least one of vehicle motion angle data, gyroscope data, and steering wheel rotation data. The vehicle motion angle data may be configured to identify a driving angle change situation of the target vehicle during driving; the gyroscope data may be configured to identify an angle change situation of the target vehicle in each angle dimension; and the steering wheel rotation data may be configured to identify a steering wheel rotation situation of the target vehicle during driving.

The processing device may determine a displacement parameter of the target vehicle in a lateral direction in the target area according to the vehicle motion data, the lateral direction being perpendicular to a travelling direction indicated by a lane corresponding to the second position. Further, according to the displacement parameter in the lateral direction, the processing device can determine a displacement distance of the target vehicle in the direction corresponding to lane change, and can further determine motion lane change parameters according to the displacement parameter, thereby making the motion lane change parameters able to identify that the target vehicle does not change the lane, or a direction of a changed lane, or a quantity of changed lanes.

Figure 4:
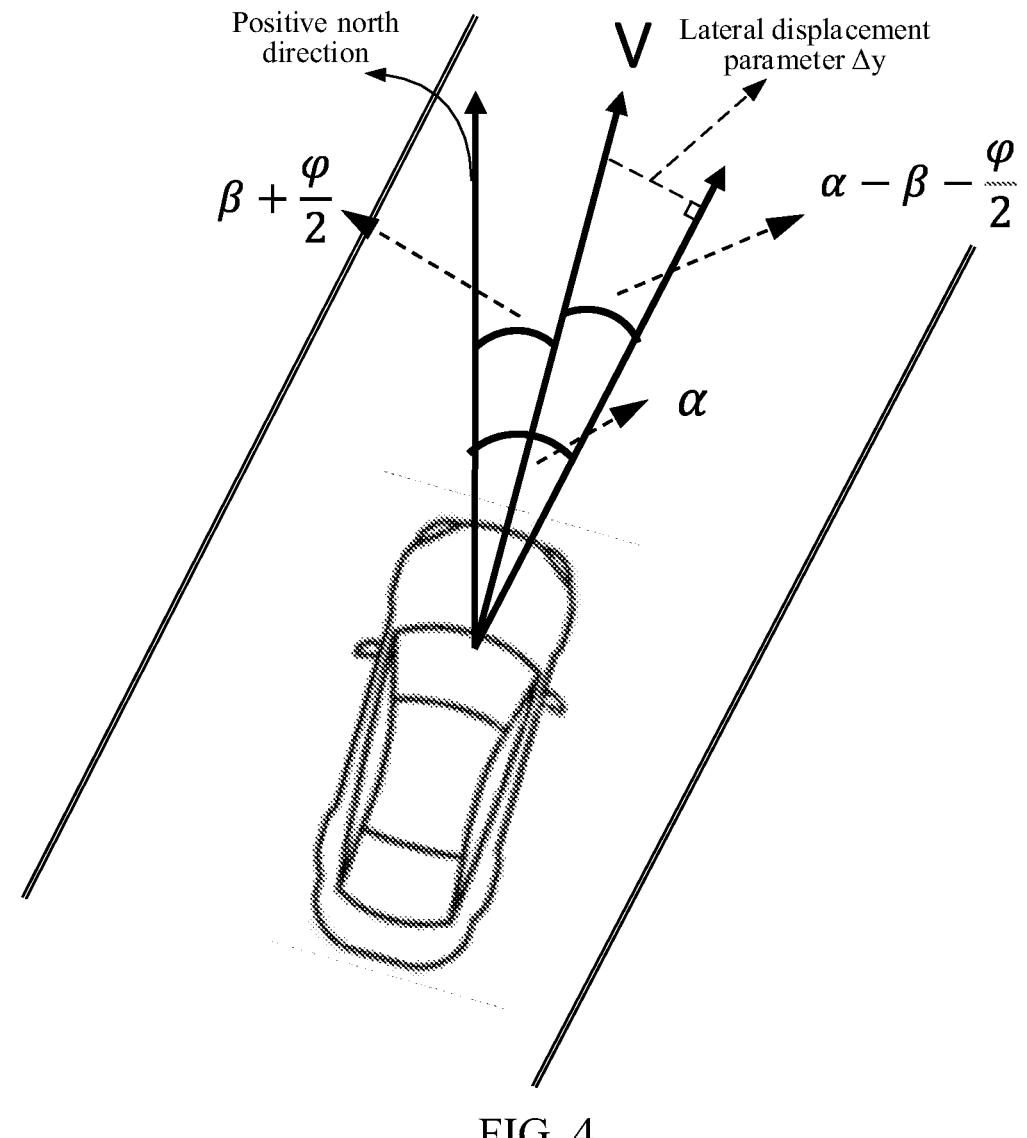
FIG. 4 is a schematic diagram of determining motion lane change parameters provided by an embodiment of the disclosure.

FIG. 4 is a schematic diagram of determining motion lane change parameters provided by an embodiment of the disclosure. Based on the vehicle motion data, the processing device may obtain a vehicle speed V of the target vehicle with a unit (m/s), and may also obtain m/s by converting from a unit (km/h). The processing device may set a sampling frequency S, so that a time interval between two times of sampling is $\Delta t=1/S$. The processing device may acquire, via an Inertial Measurement Unit (IMU) on the target vehicle, gyroscope data in the vehicle motion data, and determine a direction angle $\beta$ according to the gyroscope data, the direction angle $\beta$ referring to a driving direction of the vehicle; and the processing device may also collect a gyroscope rotation angle $\varphi$ in two sampling intervals, i.e. sampling results of direction angles before and after $\Delta t$ are $\beta$ and $\beta+\varphi$, respectively, so that an average direction angle of the target vehicle in the time $\Delta t$ is $[\beta+(\beta+\alpha)]/2=\beta+\varphi/2$, as shown in FIG. 4. For example, a road direction angle $\alpha$ and the gyroscope direction angle $\beta$ are angles expressed on the basis of a same rule, for example, a positive north direction is selected to be 0°; the clockwise direction is positive; and the range of the angles is [0,360).

According to the above parameters, the displacement parameter $\Delta y$ of the target vehicle in the lateral direction within the sampling interval $\Delta t$ may be determined by the following equation:

$$\Delta y = V*\Delta t*\sin\left(\alpha - \beta - \frac{\varphi}{2}\right)$$

By calculating the sum of $\Delta y$ over preset window time (for example, 3 s, 5 s, or the like.), the processing device may determine a cumulative lateral displacement value of the target vehicle over the window time, which may be time during which the target vehicle may complete lane change in the target area; and the cumulative lateral displacement value is a displacement parameter of the target vehicle in the lateral direction in the target area. The processing device may set the displacement parameter to be negative in case of leftward displacement and to be positive in case of rightward displacement, determine whether the target vehicle has made right lane change by determining whether the displacement parameter is greater than a set threshold, determine whether the target vehicle has made left lane change by determining whether the displacement parameter is less than the set threshold, and determine that the target vehicle has made no lane change in a case that the displacement parameter is not greater than or less than the set threshold; and the set threshold may be set based on a lane width.

In addition, the processing device may also determine the lane change situation by the gyroscope direction angle $\beta$ and the gyroscope rotation angle $\varphi$ within the two sampling intervals. For example, in a case that the target vehicle makes rightward lane change, it is necessary to turn to the right first and then turn to the left; and $\beta$ increases first and then decreases, i.e. $\varphi$ is greater than 0 first and then less than 0; and if the target vehicle makes leftward lane change, it is necessary to turn to the left first and then turn to the right; and $\beta$ decreases first and then increases, i.e. $\varphi$ is less than 0 first and then greater than 0. It is to be noted that, in a case that the road is a curved road, the target vehicle is also angularly deflected during normal driving. Therefore, in order to further improve the accuracy of determination of the lane change situation, the processing device may also perform the determination in combination with other data, such as road data.

The processing device may also determine the lane change situation based on the steering wheel rotation data. For example, when the target vehicle makes leftward lane change, it is necessary to turn a steering wheel to the left first and then turn to the right; and when the target vehicle makes rightward lane change, it is necessary to turn the steering wheel to the right first and then turn to the left. The method may also be combined with other data to improve accuracy in situations such as the curved road.

Thus, in the foregoing manner, by determining the motion lane change parameter of the target vehicle based on at least one of the vehicle motion angle data, the gyroscope data, and the steering wheel data, it is possible to ensure that the motion lane change parameter is accurately determined under complicated road conditions, thereby ensuring the accuracy of the predicted second target lane where the target vehicle is located before leaving the second position.

In addition, in order to further improve the accuracy of real-time positioning of the lane where the vehicle is located, in addition to determining the lane change parameters based on the vehicle motion data, the processing device may also determine the lane change parameters of the target vehicle in the target area based on the road condition image data. It is to be understood that when the target vehicle changes lanes, images around the target vehicle will generally change. For example, a distance between the target vehicle and the lane line in the lane in the image will change; a distance between the target vehicle and guardrails on both sides of the road will change. Based on the image information, the processing device may determine the parameters such as a direction and a distance of displacement of the target vehicle, thereby determining the lane change situation of the target vehicle.

In some embodiments, the processing device may determine image lane change parameters according to the road condition image data, the image lane change parameters being configured to identify that the target vehicle does not change the lane, or a direction of a changed lane, or a quantity of changed lanes. The processing device may determine a second target lane identifier before the target vehicle leaves the second position according to the vehicle motion data, the image lane change parameters and a first target lane identifier corresponding to the first target lane, the second target lane identifier being configured to identify the second target lane.

Based on the motion lane change parameters, the processing device may determine the lane change situation of the target vehicle in the target area based on the vehicle interior data from the angle of own motion of the vehicle. Since the vehicle motion data is mainly collected based on own motion of the vehicle, the motion lane change parameters are less affected by lane environmental changes. Based on the image lane change parameters, the processing device may determine the lane change situation of target vehicle in the target area based on a change in a vehicle exterior image from the angle of simulating vehicle vision. Since the road condition image data can more intuitively indicate the environmental change of the target vehicle, the image lane change parameters can relatively reliably reflect the actual lane change situation of the target vehicle. Based on this, by combining the motion lane change parameters and image lane change parameters, the processing device can realize complementation between the data of two dimensions, which can not only reduce influences of a complicated lane environment on a positioning result, but can also ensure the accuracy of the lane where the positioned vehicle is located to a certain extent, so as to realize the effective lane-level real-time positioning.

Figure 5:
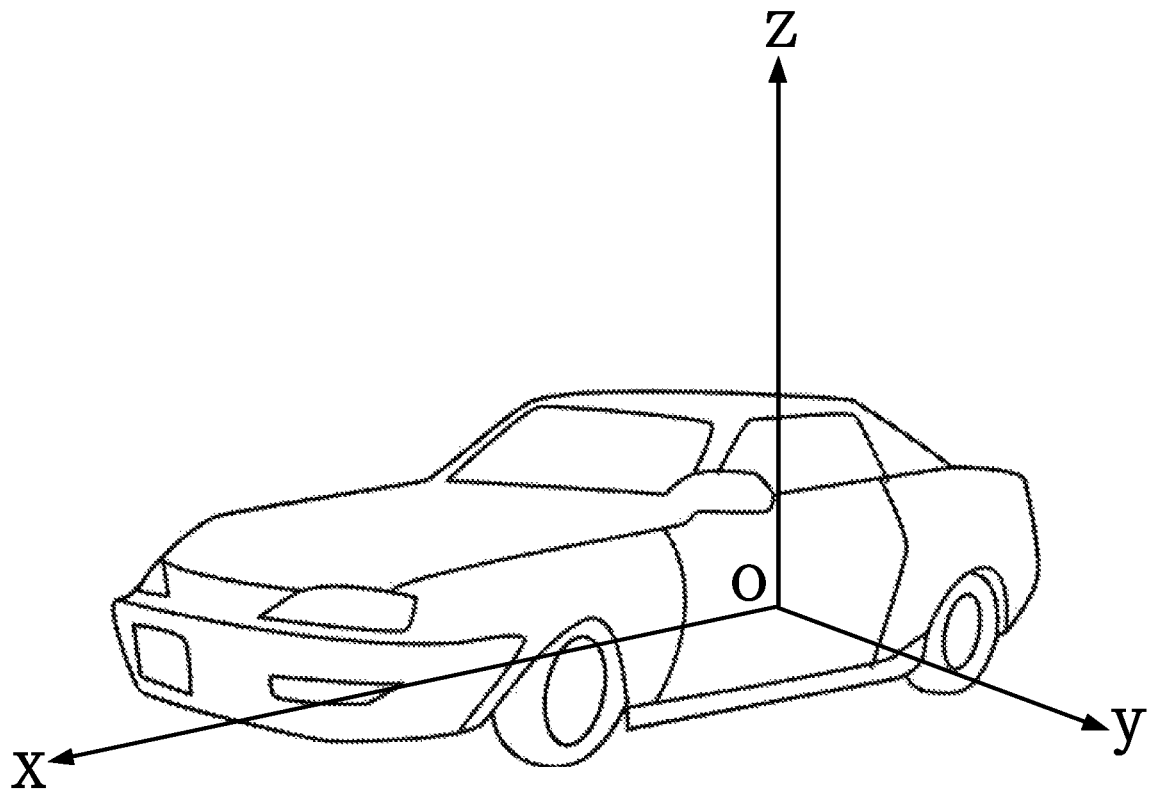
FIG. 5 is a schematic diagram of determining image lane change parameters provided by an embodiment of the disclosure.

FIG. 5 is a schematic diagram of determining image lane change parameters provided by an embodiment of the disclosure. The processing device may convert coordinates corresponding to the lane line from the camera coordinate system into the world coordinate system as in the above-mentioned embodiment, and then determine equation information corresponding to the lane line based on a conversion result and a vehicle coordinate system. An expression form of a lane line equation may be a quadratic polynomial, a cubic polynomial or other expression forms, for example:

$$y = d + a*x + b*x^2 + c*x^3$$
$$y = d + a*x + b*x^2$$

where: a, b, c and d are fitting coefficients of the polynomial; and d identifies the value of y when x=0, and may indicate a distance from the target vehicle to the lane line in a physical sense, with the distance to the left being positive and the distance to the right being negative. By analyzing the change in the value d, the processing device can determine the change in the distance between the target vehicle and the lane line, and then determine the lane change situation of the target vehicle. As shown in FIG. 5, a Vehicle Coordinate System (VCS) is a special three-dimensional dynamic coordinate system o-xyz used for describing the vehicle motion. A coordinate system origin o is fixed relative to the vehicle position; and a vehicle centroid is generally taken. When the vehicle is in a static state on a horizontal road surface, the x-axis points forward of the vehicle in parallel to the ground; the y-axis points to the left of a driver; and the z-axis points upward through the vehicle centroid.

It is to be understood that FIG. 5 is merely an illustration of a coordinate system situation. The VCS may be established in a variety of manners, such as a left-hand system, a right-hand system, and the like; and the origin of the coordinate system may be selected in a variety of manners, such as a front axle midpoint of the vehicle, a vehicle head midpoint of the vehicle, a rear axle midpoint, and the like.

Figure 6:
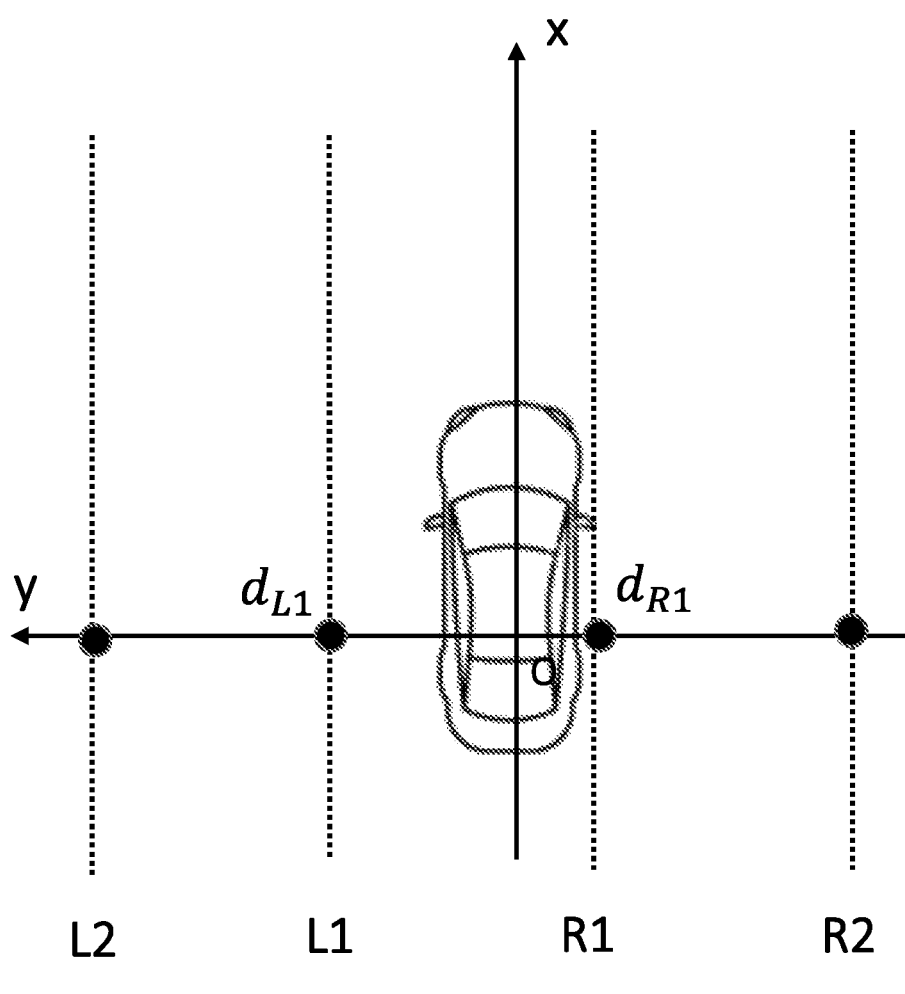
FIG. 6 is a schematic diagram of determining image lane change parameters provided by an embodiment of the disclosure.

FIG. 6 is a schematic diagram of determining image lane change parameters provided by an embodiment of the disclosure. L1 and L2 respectively indicate a first lane line and a second lane line closest to the left side of the target vehicle; R1 and R2 respectively indicate a first lane line and a second lane line closest to the right side of the vehicle; and an intercept distance parameter of the target vehicle to each lane line may be obtained according to a fitting result of the lane line equation $d_{L1}$, $d_{L2}$, $d_{R1}$ and $d_{R2}$.

Based on the intercept distance parameter, the processing device may determine the lateral displacement of the target vehicle in the road, and then determine whether the target vehicle has performed a lane change action. The processing device may determine an image lane change parameter VisionTrend; and the value includes three results: no lane change (0), lane change to the left (−1) and lane change to the right (+1). In addition, when the target vehicle performs a multi-lane lane change action in the target area, the image lane change parameter may identify the quantity of lane changes of the target vehicle by a value, for example, −2 indicates changing two lanes to the left; +3 indicates changing three lanes to the right.

Figure 7:
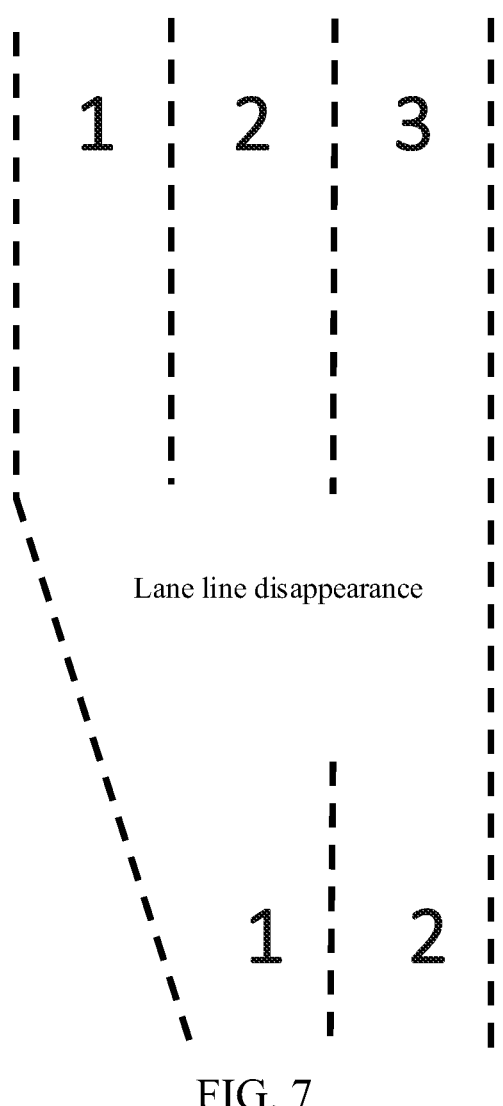
FIG. 7 is a schematic diagram of lane line disappearance provided by an embodiment of the disclosure.

It is to be understood that in some special lane environments, there may be a situation that there are no image features around the vehicle that may serve as a basis for determining the image lane change parameters. FIG. 7 is a schematic diagram of lane line disappearance provided by an embodiment of the disclosure. An area where a part of a lane line disappears may occur in a road where road expansion occurs. In order to ensure that the image lane change parameters may also be determined relatively accurately in the part of the special area and improve flexibility and applicability of the method, in some embodiments, there is a lane line disappearance area in the target area; and when the target vehicle is in the lane line disappearance area, the processing device may first determine, according to the road condition image data, a target lane line including the lane at the second position, the target lane line being a lane line that may be used for analyzing the lane change situation of the target vehicle.

Although the target lane line may not be located on both sides of the current position of the target vehicle, the processing device may fit the target vehicle and the target lane line into a same position dimension for analysis by a method of simulating a position of the lane line or simulating the position of the vehicle, so that a distance between the target vehicle and the target lane line can be determined. The processing device can determine an intercept distance parameter between the target vehicle and the target lane line; and according to the intercept distance parameter, the processing device can analyze and obtain the change in lateral displacement of the target vehicle in the road, so as to determine the image lane change parameters according to the intercept distance parameter, and make the image lane change parameters indicate the lane change situation of the target vehicle.

There are a variety of manners for fitting the target vehicle and the target lane line into the same position dimension. For example, in a first manner, the processing device may extend the target lane line to the vehicle position where the target vehicle is located to obtain a simulated lane line; and the processing device determines an intercept distance parameter between the target vehicle and the target lane line based on an intercept distance between the target vehicle and the simulated lane line; and in a second manner, the processing device may perform extension based on the position where the target vehicle is located, obtain a simulated vehicle position of the target vehicle near the target lane line, and determine an intercept distance parameter between the target vehicle and the target lane line based on an intercept distance between the simulated vehicle position and the target lane line. In this way, when there is no lane line around the vehicle body, the processing device can still relatively accurately analyze the lane change situation of the target vehicle based on a lane line far away, thereby improving practicability of the method.

Figure 12:
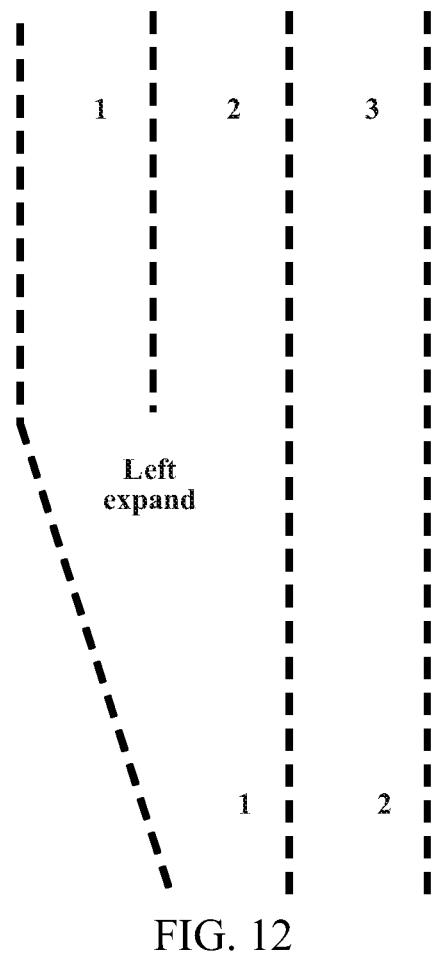
FIG. 12 is a schematic diagram of leftward lane expansion provided by an embodiment of the disclosure.
Figure 13:
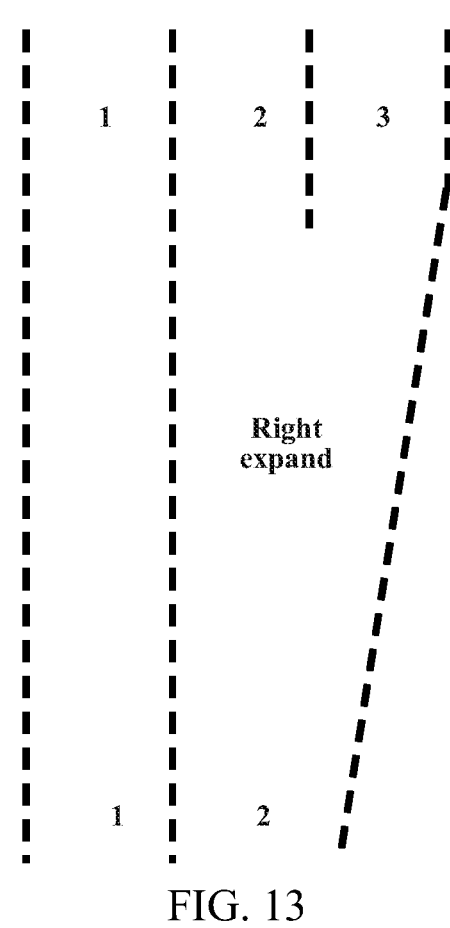
FIG. 13 is a schematic diagram of rightward lane expansion provided by an embodiment of the disclosure.
Figure 14:
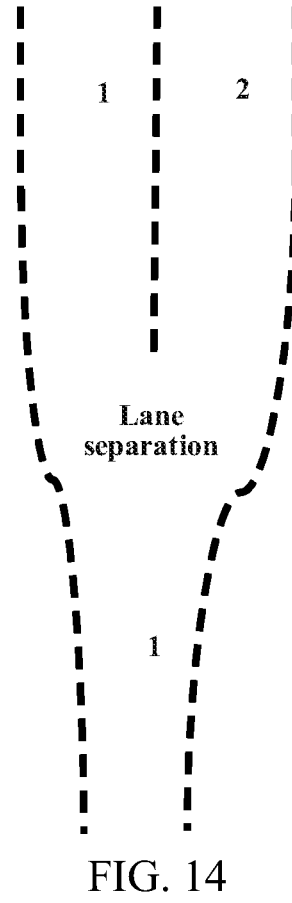
FIG. 14 is a schematic diagram of lane separation provided by an embodiment of the disclosure.

In addition to analyzing the lane change situation of the target vehicle itself, an own quantity change situation of the lanes is also an important consideration factor in the lane-level real-time positioning technology. For example, the quantity of lanes increases, i.e. the lane expansion may include two situations of leftward lane expansion and rightward lane expansion, as shown in FIG. 12 and FIG. 13. FIG. 12 shows a schematic diagram of leftward lane expansion; and FIG. 13 shows a schematic diagram of rightward lane expansion. When lane positioning conforms to a left counting rule, in a case that leftward expansion of the lane occurs, the processing device may determine that the target vehicle is located in the lane counted from left based on the quantity of leftward lane expansion, thereby avoiding the problem that the determined second lane identifier is not accurate enough due to the lack of calculation of the increase in the quantity of lanes. In addition, there may be a scenario of lane separation in lane expansion. FIG. 14 shows a schematic diagram of lane separation. The processing device may perform lane determination by any rule of counting from left or right, which is not limited herein.

In some embodiments, the processing device can determine a second target lane in conjunction with a lane topo-logical relationship to more accurately position the lane where the target vehicle is located based on a change situation in the quantity of lanes. In order to know on which road the target vehicle is located, the processing device may acquire vehicle position information of the target vehicle, the vehicle position information being configured to identify a position where the target vehicle is located. For example, the processing device may obtain vehicle position information collected by the target vehicle over a historical period, which may include, but is not limited to, Global Positioning System (GPS) information, vehicle control information, vehicle visual perception information, IMU information, and the like.

The processing device may determine positioning point information about the target vehicle at the current moment according to analysis on the information, where the positioning point information is a geographical position where the target vehicle is currently located. For example, the information may be longitude and latitude coordinates of the target vehicle. The processing device may acquire road map data corresponding to the target area according to the vehicle position information, the road map data being configured to identify relevant information of a road included in the target area. In an embodiment of the disclosure, the processing device may determine a lane topological relationship in the target area according to the road map data; the lane topo-logical relationship may include a topological relationship between a first lane and a second lane; the topological relationship is used for reflecting a quantity change situation and a quantity change manner between the first lane and the second lane; the first lane is a lane corresponding to the start position; and the second lane is a lane corresponding to the end position.

For example, the topological relationship may identify a quantity of lanes included at the first position, a quantity of lanes included at the second position, and a lane topology between the lanes included at the first position and the lanes included at the second position; and the lane topology refers to a specific change manner of changing the quantity of lanes from the quantity of lanes included at the first position to the quantity of lanes included at the second position. It is to be understood that information contained in the lane topologi-cal relationship is basic data of a road. Therefore, the processing device can realize the technical solution of the embodiments of the disclosure without obtaining sophisti-cated road map data; and the realization difficulty is low. For example, the processing device may match to a correspond-ing road position according to the positioning point infor-mation of the target vehicle, and then acquire conventional road map data, such as Standard Definition (SD) data, of the road position. The conventional road map data is used for recording basic attributes of the road, such as basic infor-mation including a road length, a quantity of lanes, a road direction, and a lane topological relationship. The conven-tional road map data is low in manufacture cost and less difficult to obtain.

The processing device may determine a second target lane identifier before the target vehicle leaves the second position according to the vehicle motion data, the road condition image data, the lane topological relationship and a first target lane identifier corresponding to the first target lane, the second target lane identifier being configured to identify the second target lane, thereby enabling the second target lane identifier to more accurately identify the lane where the target vehicle is located before leaving the second position in case of a change in the quantity of lanes.

In addition to obtaining the lane topological relationship based on the road map data, in order to further improve the accuracy of the lane where the positioned vehicle is located, the processing device may determine a relatively accurate starting point of the target area based on the road map data, and position the lane where the target vehicle is located based on the starting point of the target area, so that the determined second lane identifier can effectively identify the lane where the target vehicle is located when leaving the target area.

For example, when the processing device acquires the road map data, the road map data may include Advanced Driving Assistance System (ADAS) data, where the ADAS data is data of a transition form between SD data and High Definition (HD) data; the richness degree and accuracy of the information thereof are between the SD data and the HD data; and information such as a lane line type, a color, a lane attribute, a lane number change point, and a lane virtual-solid line change point in the road is mainly increased relative to the SD data. Based on some feature point information included in the ADAS data, the processing device may determine a first position and a second position corresponding to the target area.

Figure 8:
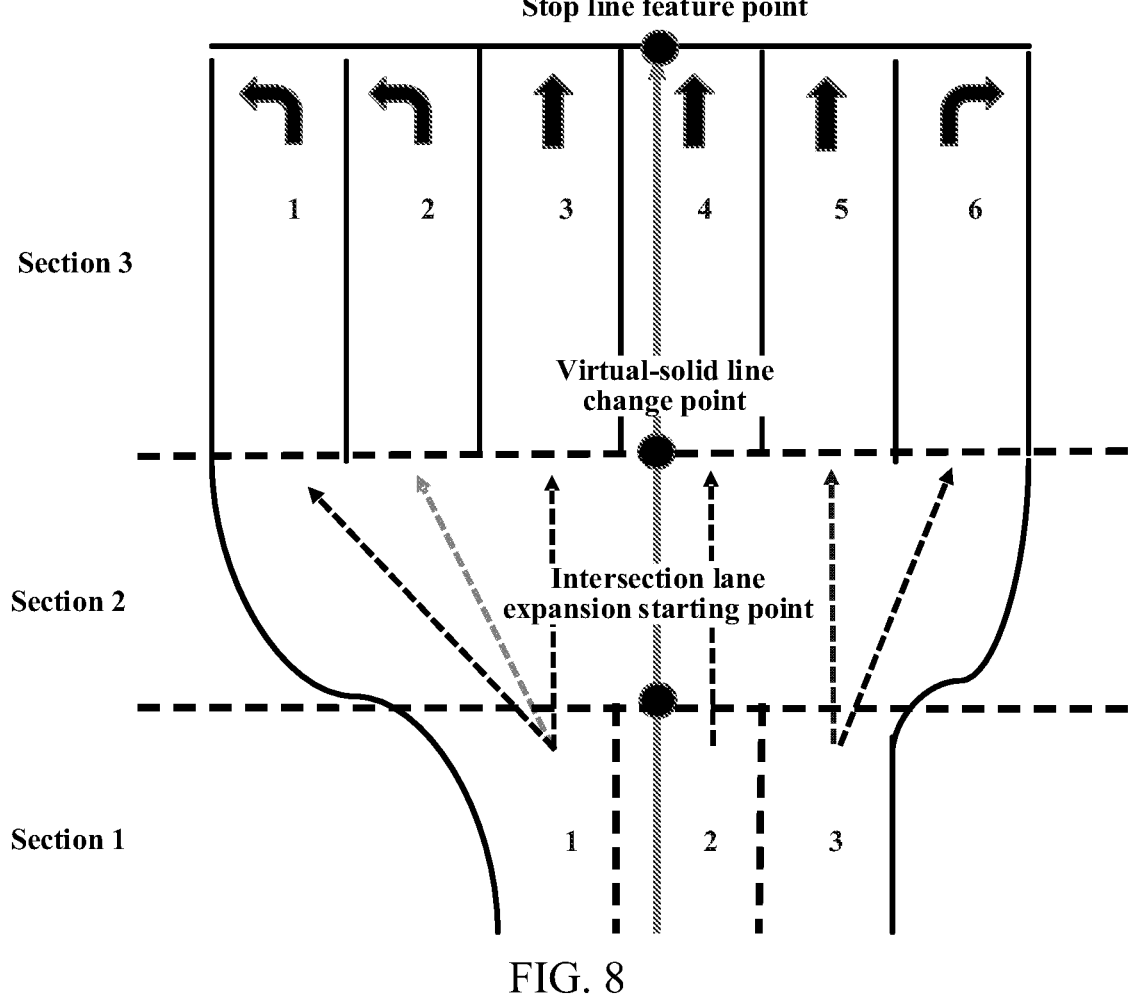
FIG. 8 is a schematic diagram of road map data provided by an embodiment of the disclosure.

FIG. 8 is a schematic diagram of road map data provided by an embodiment of the disclosure. On the basis of conventional SD data, the ADAS data may add a plurality of Feature Points into the data, and divide the road into a more detailed plurality of Sections through the feature points; and each Section has information about the quantity of lanes and associated information about the lanes themselves. For example, through the ADAS data, the processing device may determine an intersection lane expansion starting point and a stop line feature point in FIG. 8. The intersection lane expansion starting point is configured to identify a first position; the stop line feature point is configured to identify a second position; an area between the intersection lane expansion starting point and the stop line feature point is a target area; the target area is an intersection area where lane expansion has occurred; the intersection area is composed of Section 2 and Section 3; and the lanes in the road start expansion from 3 lanes to 6 lanes from the lane expansion starting point to the stop line feature point. The processing device may determine a first target lane corresponding to the target vehicle when the target vehicle reaches the lane expansion starting point, then acquire road condition image data and vehicle motion data of the target vehicle in Section 2 and Section 3, and determine a second target lane identifier corresponding to the target vehicle before the target vehicle reaches the stop line feature point based on the road condition image data and the vehicle motion data, the lane topological relationship, and the first target lane identifier corresponding to the first target lane.

Further, through the ADAS data, the processing device may also know lane-level topology information. For example, lanes 1, 2 and 3 after expansion correspond to lane 1 before expansion; and lanes 5, 6 after expansion correspond to lane 3 before expansion. Based on the lane-level topology information, the processing device may further verify the determined second target lane identifier. For example, in a case that the first target lane is lane 1, the target vehicle will enter lanes 1, 2 and 3 after expansion in most cases; and in a case that the second target lane identified by the second target lane identifier is lane 6 after expansion, it indicates that the accuracy of a lane positioning result may be low.

It is to be understood that lane change of the vehicle in a road also requires certain conditions, such as compliance with traffic regulations, and lane change allowed at a position where a broken line or lane line disappears. Therefore, not all areas in the target area may allow the target vehicle to change lanes. In order to further improve the timeliness of lane-level real-time positioning, the processing device may pay attention to a lane change situation of the target vehicle in a variable lane area in the target area, the variable lane area being an area where the vehicle is allowed to perform a lane change action. Since after leaving the variable lane area, the target vehicle will no longer perform the lane change action with a large probability, the processing device may acquire all the data for analyzing the lane change situation during driving of the target vehicle in the variable lane area, and determine the second lane identifier before the target vehicle leaves the variable lane area, so as to bring forward the time of determining the second lane identifier without waiting for the target vehicle to run out of the target area.

In some embodiments, the road map data further includes a third position, the third position being an end position of a variable lane area in the target area in a driving direction of the target vehicle; and the third position being located between the first position and the second position. The processing device may acquire the vehicle motion data of the target vehicle between the first position and the third position, and road condition image data. Since the target vehicle enters an area in the road where lane change is not allowed after passing the third position, namely, no lane change action is performed with a high probability, the lane change situation of the target vehicle in the target area can be more accurately and comprehensively reflected by the vehicle motion data of the target vehicle between the first position and the third position, and road condition image data. The processing device may determine a second target lane identifier before the target vehicle leaves the third position according to the vehicle motion data, the road condition image data and a first target lane identifier corresponding to the first target lane, the second target lane identifier being configured to identify the second target lane, so that the time required for lane positioning can be further shortened.

As shown in FIG. 8, based on the ADAS data, the processing device may also determine a virtual-solid line change point between the stop line feature point and the intersection lane expansion starting point as the third position, which is a point where the lane line changes from disappearance to a solid line. Since the lane line disappears between the intersection lane starting point and the virtual-solid line change point, the target vehicle may perform the lane change action; and after passing through the virtual-solid line change point, the lane line changes to a solid line; and the target vehicle cannot perform the lane change action according to traffic rules. Based on this, the processing device may acquire vehicle motion data and road condition image data of the target vehicle between the road condition lane expansion starting point and the virtual-solid line change point, and determine the second target lane identifier before or when the target vehicle reaches the virtual-solid line change point.

As known from above-mentioned description, the road condition image data can relatively intuitively reflect the change of an image around the target vehicle. For example, some image features which can be used for lane positioning may be collected; and the image features have strong objectivity and reliability. Therefore, the processing device can further verify the determined lane positioning result based on the image features.

In some embodiments, the processing device may determine a pending lane identifier of a lane where the target vehicle is located at the second position according to the road condition image data, the pending lane identifier being able to relatively intuitively reflect the lane where the target vehicle is located from the angle of surrounding images of the vehicle. It is to be understood that an edge lane in the road generally has relatively obvious image features; and the edge lane is an outermost lane in the road. For example, in FIG. 8, lane 1 and lane 3 before expansion are the edge lanes on the road. Generally, there are an edge guardrail, a curb, or the like on the edge lane to prevent the vehicle from moving out of the lane. In a case that such an image feature appears in the road condition image data, it indicates that the target vehicle is located on the edge lane with a large probability. It is shown that, in a case that the pending lane identifier determined based on the road condition image data reflects that the lane in such a special lane, the pending lane identifier usually has high reliability.

Based on this, in a case that the lane identified by the pending lane identifier is an edge lane of the lanes included at the second position, the processing device may determine the pending lane identifier as a second target lane identifier, so that the accuracy of the second target lane identifier can be further improved based on intuitive image characteristics reflected in the road condition image data.

Similarly, in a case that it is determined that the lane identified by the pending lane identifier is not an edge lane of the lanes included at the second position, it indicates that there may be no image feature in the road condition image data which can be used to reflect the edge lane, namely, the target vehicle is not located on the edge lane with a high probability. Meanwhile, in a case that the lane identified by the second target lane identifier, which is determined by the processing device based on the vehicle motion data and the road condition image data, is the edge lane, the second target lane identifier is a wrong lane identifier with a high probability. Therefore, the processing device may correct the second target lane identifier to improve the accuracy of the second target lane identifier.

In some embodiments, the processing device may update the second target lane identifier to a lane identifier of an adjacent lane to the second target lane in response to the second target lane being an edge lane of the lanes included at the second position. It is to be understood that since the second target lane identifier is determined by integrating the vehicle motion data and the road condition image data, the second target lane identifier itself has certain accuracy; and even if the lane identified by the second target lane identifier has a certain error from the lane where the vehicle is actually located, the error is usually within a small error range. Therefore, by changing the lane to an adjacent lane of the second target lane, the accuracy and rationality of the second target lane identifier can be ensured while correcting the second target lane identifier based on the road condition image data.

In the foregoing manner, the processing device may determine a second target lane with high accuracy, thereby enabling some effective practical applications based on the second target lane. For example, there is usually a corresponding lane driving identifier on the lane, the lane driving identifier being configured to identify a travelable direction of the corresponding lane. For example, as shown in FIG. 8, among the six lanes after expansion, the lane driving identifiers of lane 1 and lane 2 are left-turn identifiers indicating that the lanes allow turning to the left; the lane driving identifiers of lane 3, lane 4 and lane 5 are straight driving identifiers indicating that the lanes allow straight driving; and the lane driving identifier of lane 6 is a right-turn identifier indicating that the lane allows turning to the right. Therefore, after determining the second target lane, the processing device may know the travelable direction of the target vehicle during subsequent travelling by the lane driving identifier corresponding to the second target lane.

The travelable direction of the vehicle is an important reference factor in a vehicle navigation technology; and in a case that the driving direction indicated by a driving route corresponding to the vehicle in the target area does not match the travelable direction corresponding to the second target lane, the target vehicle cannot be able to continue driving according to the driving route. In the related art, since it is impossible to position the lane where the lane is located in a complicated road area where the lane expansion occurs in time through a low-cost technology, the lane where the vehicle is located can be determined only after the vehicle moves out of the area and performs a corresponding straight driving or steering action; and at this time, the time for planning the driving route of the vehicle is relatively late, which makes it difficult to provide a user with good navigation experience.

In the embodiments of the disclosure, the processing device may determine the lane where the target vehicle is located before the target vehicle leaves the target area. Hence, before the target vehicle leaves the target area, the processing device may plan the driving route of the target vehicle according to the travelable direction corresponding to the second target lane, so that the user can obtain more accurate driving route navigation before leaving the target area, thereby further improving the navigation experience of the user. In some embodiments, the processing device may determine a lane driving identifier corresponding to the second target lane, the lane driving identifier being configured to identify a travelable direction of the second target lane. In order to determine whether the lane where the target vehicle is located is suitable for current navigation planning, the processing device may obtain a navigation planning route corresponding to the target vehicle, the navigation planning route used for indicating how the target vehicle is travelling to a destination.

The processing device may acquire a driving guide direction related to the target area in the navigation planning route, and determine whether the driving guide direction matches the lane driving identifier, namely, whether the travelable direction identified by the lane driving identifier includes the driving guide direction. The driving guide direction refers to a direction required for the target vehicle to travel to the destination. If the driving guide direction associated with the target area in the navigation planning route does not match the lane driving identifier, it indicates that the target vehicle cannot travel according to the navigation planning route. Meanwhile, the processing device may re-determine the navigation planning route according to the lane driving identifier before the target vehicle leaves the second position, so that the navigation planning route can be updated in time; the user can know the next driving route before leaving the target area; and the navigation experience of the user can be further improved. Meanwhile, since the navigation update can be performed in advance, the user can avoid driving the vehicle for inefficient driving, thereby saving energy, and reducing environmental pollution and resource consumption.

Figure 9:
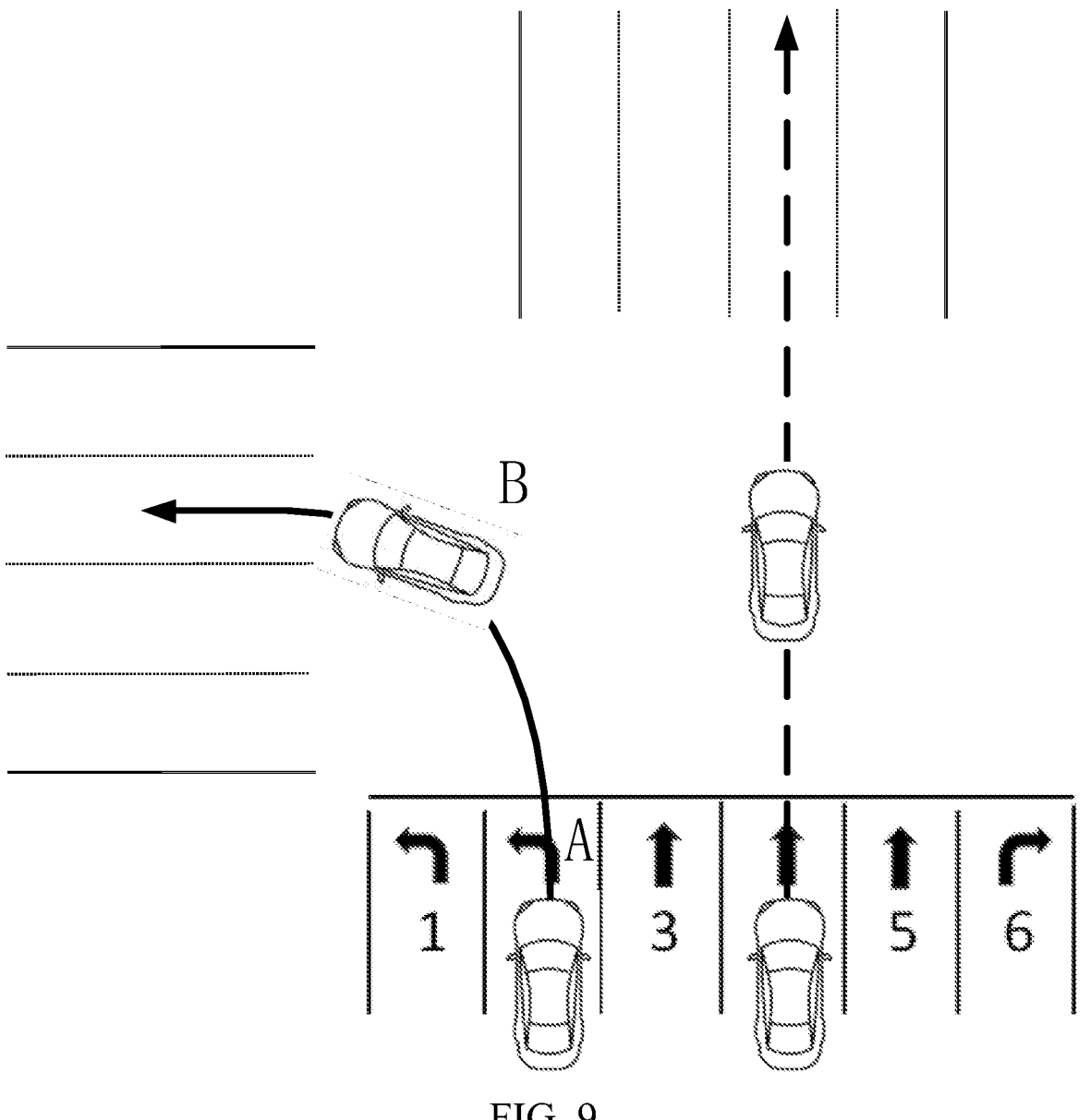
FIG. 9 is a schematic diagram of updating a navigation planning route provided by an embodiment of the disclosure.

FIG. 9 is a schematic diagram of updating a navigation planning route provided by an embodiment of the disclosure, where the dotted line is the navigation planning route before the update; the solid line is the navigation planning route after the update; and the target area is an intersection area. As shown in the diagram, in the navigation planning route before the update, the processing device travels straight after leaving the intersection. However, since the target vehicle is in the left-turn lane at the intersection, the vehicle can only turn left. In the related art, it is determined that the target vehicle has traveled into a wrong lane after waiting for the target vehicle to reach point B; and then the navigation planning route can be re-determined with a slow update speed. In the embodiments of the disclosure, the processing device may acquire the lane driving identifier corresponding to the lane from the ADAS data based on the second target lane identified by the second target lane identifier, which is the left-turn identifier in FIG. 8. After determining that the left-turn identifier does not match the straight driving direction related to the target area in the navigation planning route, the processing device may complete the update of the navigation planning route based on the left-turn identifier, the current position of the target vehicle and the destination of the target vehicle before the target vehicle reaches the vicinity of point A, so as to further improve the speed and efficiency of navigation planning and improve the navigation experience of the user.

In order to facilitate understanding of the technical solution provided by the embodiments of the disclosure, a positioning method provided by the embodiments of the disclosure will be described in conjunction with a practical application scenario.

In the practical application scenario, the target area is an intersection area where a lane expansion situation occurs, as shown in FIG. 8; and the processing device is an on board terminal with a lane-level real-time positioning function. FIG. 10 is an architecture diagram of an on board terminal capable of lane-level real-time positioning provided by an embodiment of the disclosure. The positioning method provided by the embodiments of the disclosure will be described based on the on board terminal architecture diagram.

Figure 18:
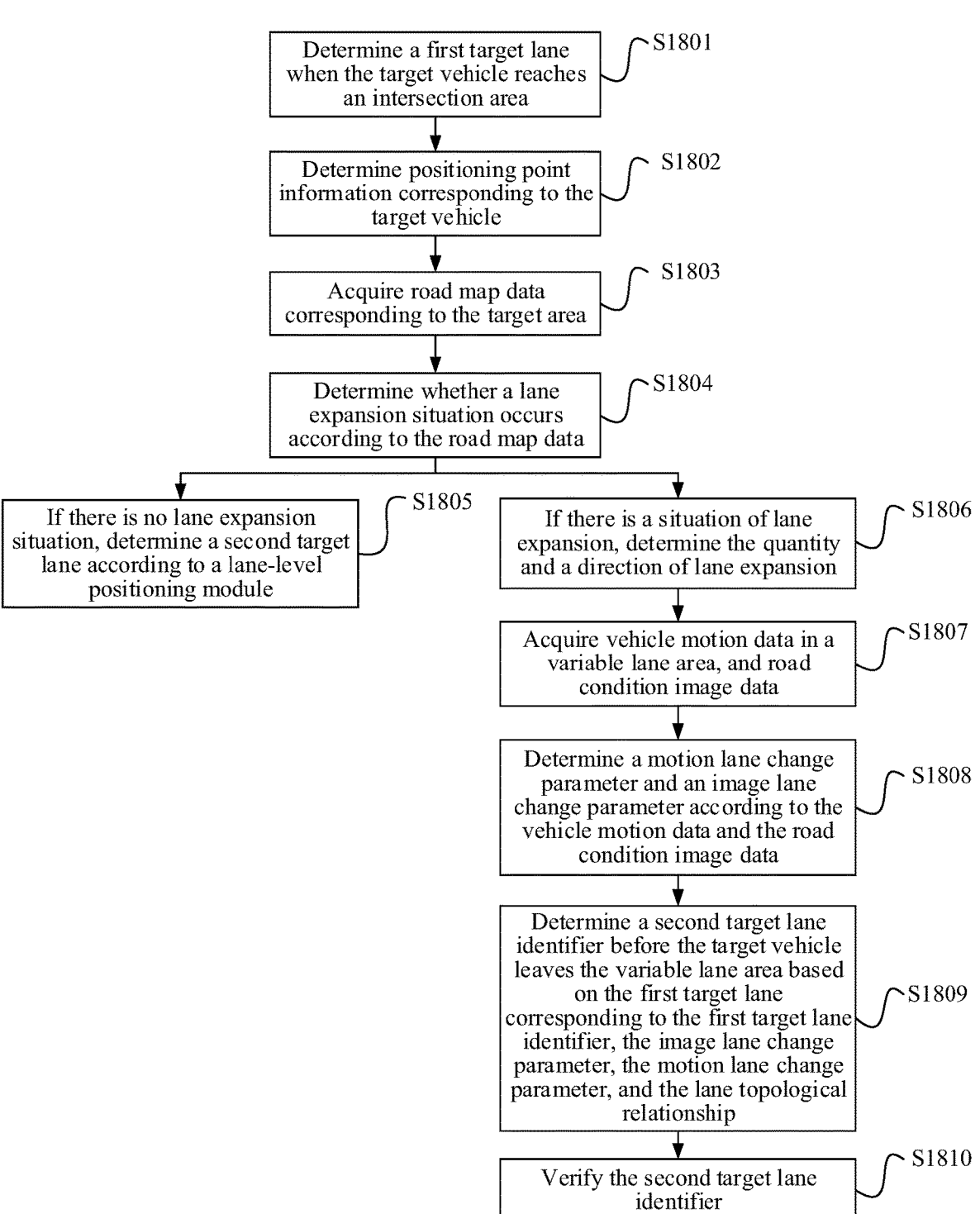
FIG. 18 is a flowchart of a positioning method in a practical application scenario provided by an embodiment of the disclosure.

FIG. 18 is a flowchart of a positioning method in a practical application scenario provided by an embodiment of the disclosure. The method includes the following operations:

S1801: Determine a first target lane when the target vehicle reaches an intersection area.

First, when the target vehicle reaches the intersection area, a lane-level positioning module may position the lane where the target vehicle is located, and obtain a first target lane identifier LaneIndex corresponding to the first target lane. There are a plurality of methods for determining whether the target vehicle reaches the intersection area. For example, whether there is an intersection in a nearby area is determined through road map data acquired by a map data module; in a case that there is an intersection, the distance of the target vehicle from an intersection lane expansion change point is calculated; and it is determined that the vehicle reaches the intersection area when the distance is less than a certain threshold (for example, 5 m and 10 m).

S1802: Determine positioning point information corresponding to the target vehicle.

Then, by a vehicle positioning module, the positioning point information corresponding to the target vehicle may be determined, the positioning point information being vehicle position information of the target vehicle.

S1803: Acquire road map data corresponding to the target area.

Based on the positioning point information, the map data module may acquire road map data corresponding to the target area, where the road map data includes information such as an intersection lane expansion starting point, a virtual-solid line change point, a stop line feature point, a lane topological relationship and a lane driving identifier on the lane in the intersection area.

S1804: Determine whether a lane expansion situation occurs according to the road map data.

According to the lane topological relationship in the road map data, the processing device may determine whether the lane expansion situation occurs in the intersection area, namely, whether the quantity of lanes at the start position and the end position of the intersection area are consistent. If so, it indicates that no lane expansion situation exists; and the process may proceed to S1805; and if not, it indicates that the lane expansion situation exists; and the process may proceed to S1806.

There are following manners for determining whether lane expansion occurs in the intersection area:

first manner: whether the total quantity of lanes LaneCnt-Cur at the end position of the intersection area and the total quantity of lanes LaneCntPre at the start position are equal is determined based on the local ADAS data in the road map data;

second manner: whether the ADAS data has information of the lane expansion starting point is determined; and if so, it indicates that the lane expansion has occurred; and third manner: determination is made based on the topological relationship of lanes in the ADAS data. For example, in the area shown in FIG. 8, lane 1 at the start position is connected to lanes 1, 2 and 3 at the end position; and it is known that the area has a situation of leftward expansion of two lanes; and lane 3 at the start position is connected to lanes 4 and 6 at the intersection position; and it is known that the area has a situation of rightward expansion of one lane.

S1805: If there is no lane expansion situation, determine a second target lane according to a lane-level positioning module.

In a case that it is determined that there is no lane expansion situation at the intersection based on the lane topological relationship, the on board terminal may consider that such a scenario is relatively easy to perform lane-level positioning; and the positioning result of the lane-level positioning module is directly taken as a second target lane identifier, namely, LaneIndexCrossing=LaneIndex.

S1806: If there is a situation of lane expansion, determine the quantity and a direction of lane expansion.

In a case that there is a situation of lane expansion, the on board terminal may calculate the quantity of left and right lane expansions based on the lane topological relationship; and a specific manner is as follows:

left expansion information is determined according to a lane connection relationship from a first left lane at the start position to the end position (setting the first left lane to connect m lanes at the end position); and the quantity of left expansions is Left_expand=m1;

right expansion information is determined according to a lane connection relationship from a first right lane at the start position to the end position (setting the first right lane to connect n lanes at the end position); and the quantity of right expansions is right_expand=n1; and it is to be noted that the value may also be acquired directly from the ADAS data.

S1807: Acquire vehicle motion data in a variable lane area, and road condition image data.

An on board terminal may acquire data based on a plurality of feature points determined by the map data module; and in a practical application scenario, the on board terminal may respectively acquire the vehicle motion data and road condition image data of the target vehicle between the intersection lane expansion starting point and the virtual-solid line change point via a motion data acquisition module and an image acquisition unit in a vision module. The vehicle motion data includes vehicle speed data acquired by a vehicle speed acquisition unit, steering wheel rotation data acquired by a steering wheel angle acquisition unit, IMU data acquired by an IMU acquisition unit, and the like. The vehicle speed data and steering wheel rotation data may be acquired from a vehicle Controller Area Network (CAN) bus; the IMU data may be acquired from sensors mounted on the vehicle; and a GPS signal may be acquired from a vehicle Telematics BOX (T-BOX).

S1808: Determine a motion lane change parameter and an image lane change parameter according to the vehicle motion data and the road condition image data.

Based on the road condition image data, an image processing unit in the vision module may determine the image lane change parameter VisionTrend, where the image lane change parameter may identify that the target vehicle has no lane change or the quantity of lane changes by a numerical value, and identify a lane change direction of the target vehicle by positive and negative values. The lane change to the left is a negative number; and the lane change to the right is a positive number. For example, changing two lanes to the left may be −2. In addition, based on an image feature corresponding to a special lane in a road condition image, the on board terminal may also determine a pending road identifier VisionLaneIndex, which may identify whether the target vehicle is in an edge lane at the intersection area end position.

The intersection lane-level positioning module may determine the motion lane change parameter DrTrend based on the vehicle motion data, the motion lane change parameter being consistent with the numerical rule of the image lane change parameter.

S1809: Determine a second target lane identifier before the target vehicle leaves the variable lane area based on the first target lane corresponding to the first target lane identifier, the image lane change parameter, the motion lane change parameter, and the lane topological relationship.

The intersection lane-level positioning module may determine a second target lane identifier based on the first target lane identifier, the motion lane change parameter, the image lane change parameter, and the direction and quantity of lane expansions in the lane topological relationship.

The intersection lane-level positioning module may firstly determine whether the pending road identifier VisionLaneIndex is a first left lane or a first right lane, namely, whether the VisionLaneIndex is equal to 1 or LaneCntCur. If so, the VisionLaneIndex may be determined as a second target lane identifier LaneIndexCrossing.

In a case that the lane is not an edge lane, a relatively accurate comprehensive lane change parameter FusionTrend may be determined according to image lane change parameter and the motion lane change parameter. A determination manner is as follows:

when both the image lane change parameter and the motion lane change parameter identify the target vehicle as left/right lane change, an integrated lane change parameter is output as left/right lane change;

otherwise, the output result is no lane change, with FusionTrend=0; and a lane change parameter with a higher confidence level may also be selected for output;

when any one of the image lane change parameter and the motion lane change parameter is left/right lane change; and the other is no lane change, the left/right lane change result is output; and in other cases, no lane change may be output.

The intersection lane-level positioning module may determine the second target lane identifier by the following formula:

$$LaneIndexCrossing = LaneIndex + \text{Left\_expand} + FusionTrend$$

It is to be understood that when the lane change parameter is set to be negative for left lane change and positive for right lane change, the lane right expansion value does not affect the second target lane identifier. Hence, it is only necessary to pay attention to the left lane change. For example, when LaneIndex=1, Left_expand=2 and FusionTrend=−2, namely, the lane identified by the first target lane identifier is lane 1, the lane is expanded to the left by 2 lanes; the target vehicle performs a lane change action to the left by 2 lanes; and the finally acquired second target lane identifier LaneIndexCrossing=1+2−2=1, namely, the target vehicle is in lane 1 at the second position.

Since the data required for the determination process of the above-mentioned second target lane identifier can be completely acquired before the target vehicle reaches the virtual-solid line change point, the on board terminal can complete the above-mentioned process before the target vehicle leaves the variable lane area.

S1810: Verify the second target lane identifier.

The on board terminal may further verify the second target lane identifier in the following manners:

first manner: since the minimum lane identifier is 1, in a case that LaneIndexCrossing<1, La-neIndexCrossing=1 may be set;

second manner: since the maximum lane identifier is LaneCntCur, in a case that LaneIndexCrossing>LaneCntCur, LaneIndexCrossing=LaneCntCur may be set;

third manner: since the lane identified by the lane identifier to be identified is not an edge lane, in a case that LaneInd-exCrossing=1, LaneIndexCrossing=2 may be set; and in a case that LaneIndexCrossing=LaneCntCur, LaneIndexCrossing=LaneCntCur−1 may be set.

Finally, it can be determined whether the second target lane identifier conforms to the communication relationship between lanes based on the lane topological relationship. For example, in the area shown in FIG. 8, lane 3 at the start position is communicated to lanes [5, 6] at the end position. In a case that LaneIndex=3, the LaneIndexCrossing value is generally in a set [5, 6]. In a case that LaneIndexCrossing is not in the set, a relatively close result can be selected from the set for output.

Figure 15:
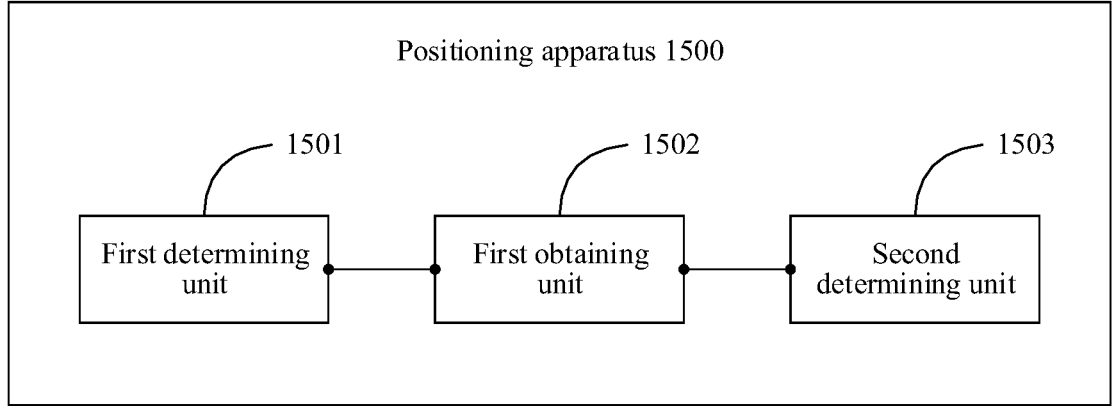
FIG. 15 is a structural block diagram of a positioning apparatus provided by an embodiment of the disclosure.

Based on a positioning method provided by the above-mentioned embodiment, an embodiment of the disclosure further provides a positioning apparatus. FIG. 15 is a structural block diagram of a positioning apparatus 1500 provided by an embodiment of the disclosure, where the apparatus 1500 includes a first determining unit 1501, a first obtaining unit 1502 and a second determining unit 1503:

the first determining unit 1501 is configured to determine a first target lane where a target vehicle is located in a case that the target vehicle reaches a first position in a target area on a road; the target area including the first position and a second position; a quantity of lanes included at the first position being different from a quantity of lanes included at the second position; the first position being a start position in the target area in a driving direction of the target vehicle; and the second position being an end position in the target area in the driving direction of the target vehicle;

the first obtaining unit 1502 is configured to acquire vehicle motion data of the target vehicle in the target area, and road condition image data; and the second determining unit 1503 is configured to determine a second target lane where the target vehicle is located before leaving the second position according to the vehicle motion data, the road condition image data, and the first target lane.

In some embodiments, the second determining unit 1503 may be further configured to:

determine motion lane change parameters according to the vehicle motion data, the motion lane change parameters being configured to indicate that the target vehicle does not change a lane, or a direction of a changed lane, or a quantity of changed lanes; and determine a second target lane identifier before the target vehicle leaves the second position according to the motion lane change parameters, the road condition image data and a first target lane identifier corresponding to the first target lane, the second target lane identifier being configured to identify the second target lane.

In some embodiments, the vehicle motion data includes at least one of vehicle motion angle data, gyroscope data, and steering wheel rotation data; and the second determining unit 1503 may be further configured to:

determine a displacement parameter of the target vehicle in a lateral direction in the target area according to the vehicle motion data, the lateral direction being perpendicular to a travelling direction indicated by a lane corresponding to the second position; and determine the motion lane change parameters according to the displacement parameter.

In some embodiments, the second determining unit 1503 may be further configured to:

determine image lane change parameters according to the road condition image data, the image lane change parameters being configured to indicate that the target vehicle does not change a lane, or a direction of a changed lane, or a quantity of changed lanes; and determine a second target lane identifier before the target vehicle leaves the second position according to the vehicle motion data, the image lane change parameters and a first target lane identifier corresponding to the first target lane, the second target lane identifier being configured to identify the second target lane.

In some embodiments, a lane line disappearance area exists in the target area; and the second determining unit 1503 may be further configured to:

determine a target lane line of the lane included at the second position according to the road condition image data in a case that the target vehicle is located in the lane line disappearance area;

determine an intercept distance parameter between the target vehicle and the target lane line; and

determine the image lane change parameters according to the intercept distance parameter.

In some embodiments, the apparatus 1500 may further include a second acquisition unit, a third acquisition unit and a third determining unit:

the second acquisition unit is configured to acquire vehicle position information corresponding to the target vehicle;

the third acquisition unit is configured to acquire road map data corresponding to the target area according to the vehicle position information; and the third determining unit is configured to determine a lane topological relationship in the target area according to the road map data, the lane topological relationship including a topological relationship between a first lane and a second lane, the first lane being a lane corresponding to the start position, and the second lane being a lane corresponding to the end position.

The second determining unit 1503 may be further configured to:

determine a second target lane identifier before the target vehicle leaves the second location according to the vehicle motion data, the road condition image data, the lane topological relationship, and a first target lane identifier corresponding to the first target lane, the second target lane identifier being configured to identify the second target lane.

In one possible implementation, the road map data further includes a third position, the third position being an end position of a variable lane area in the target area in a driving direction of the target vehicle; and the third position being located between the first position and the second position.

The first obtaining unit 1502 may be further configured to:

acquire vehicle motion data of the target vehicle between the first position and the third position, and road condition image data; and the second determining unit 1503 is further configured to:

determine a second target lane identifier before the target vehicle leaves the third position according to the vehicle motion data, the road condition image data and a first target lane identifier corresponding to the first target lane, the second target lane identifier being configured to identify the second target lane.

In some embodiments, the apparatus 1500 may further include a fourth determining unit, a fourth acquisition unit and a fifth determining unit:

the fourth determining unit is configured to determine a lane driving identifier corresponding to the second target lane, the lane driving identifier being configured to identify a travelable direction of the second target lane;

the fourth acquisition unit is configured to acquire a navigation planning route corresponding to the target vehicle; and the fifth determining unit is configured to re-determine the navigation planning route according to the lane driving identifier before the target vehicle leaves the second position in a case that a driving guide direction associated with the target area in the navigation planning route does not match the lane driving identifier.

In some embodiments, the apparatus 1500 may further include a sixth determining unit and a seventh determining unit:

the sixth determining unit is configured to determine a pending lane identifier of a lane where the target vehicle is located at the second position according to the road condition image data; and the seventh determining unit is configured to determine the pending lane identifier as a second target lane identifier in a case that the lane identified by the pending lane identifier is an edge lane of the lanes included at the second position, the second target lane identifier being configured to identify the second target lane.

In some embodiments, in a case that it is determined that the lane identified by the pending lane identifier is not an edge lane of the lanes included at the second position, the apparatus 1500 may further include an update unit:

the update unit is configured to update the second target lane identifier to a lane identifier of an adjacent lane to the second target lane in response to the second target lane being an edge lane of the lanes included at the second position.

An embodiment of the disclosure further provides a computer device as described below in conjunction with the accompanying drawings. The embodiments of the disclosure provides a device, where the device may also be a terminal device; and the terminal device may be any intelligent terminal including a mobile phone, a tablet computer, a Personal Digital Assistant (PDA), a Point of Sales (POS) and an on board computer. The terminal device as a mobile phone is taken as an example.

Figure 16:
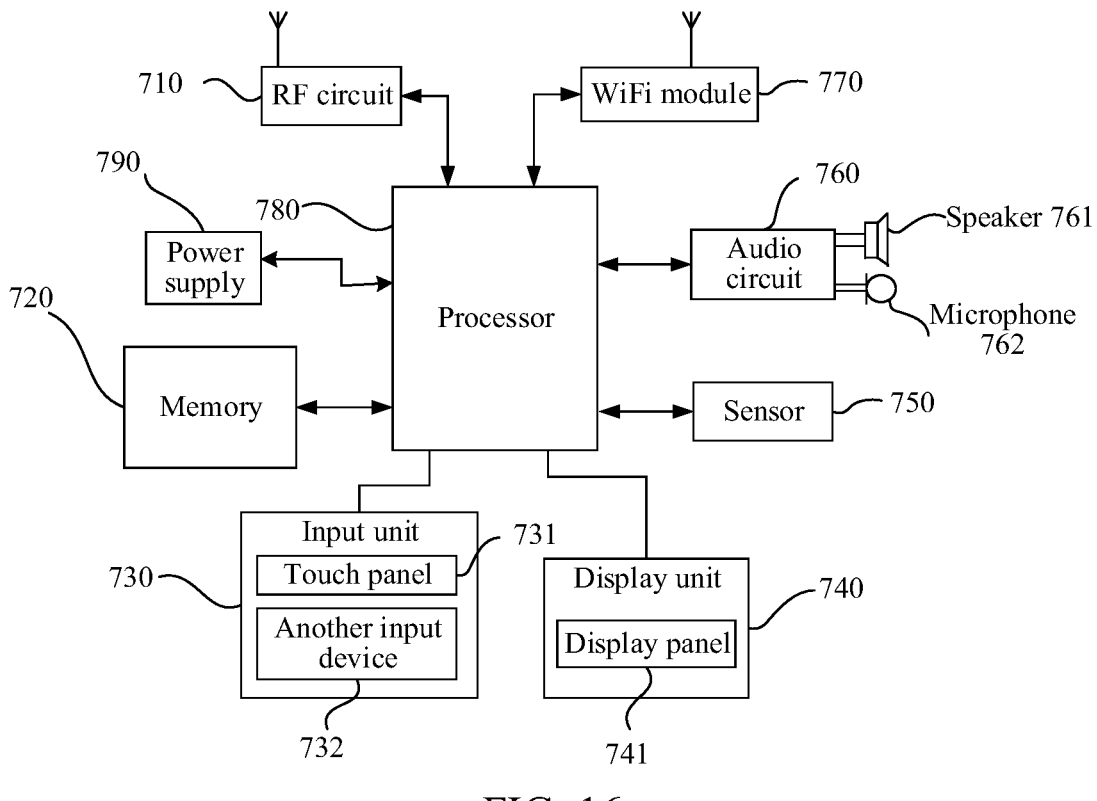
FIG. 16 is a structural diagram of a computer device provided by an embodiment of the disclosure.

FIG. 16 is a block diagram showing a partial structure of a mobile phone related to a terminal device provided by an embodiment of the disclosure. With reference to FIG. 16, the mobile phone includes: a radio frequency (RF) circuit 710, a memory 720, an input unit 730, a display unit 740, a sensor 750, an audio circuit 760, a wireless fidelity (WiFi) module 770, a processor 780, a power supply 790, and the like. It is to be understood by a person skilled in the art that the mobile phone structure shown in FIG. 16 does not constitute limitation to the mobile phone and may include more or fewer components than those shown in the diagram, or a combination of some components, or a different arrangement of the components.

The RF circuit 710 may be configured to receive and transmit a signal in a process of transceiving information or calling, and in particular, after receiving downlink information about a base station, provide the same to the processor 780 for processing; in addition, uplink data is transmitted to the base station. In general, the RF circuit 710 includes, but is not limited to, an antenna, at least one amplifier, a transceiver, a coupler, a Low Noise Amplifier (LNA), a duplexer, and the like. In addition, RF circuit 710 may also communicate with networks and other devices via wireless communication. The wireless communication may use any communication standard or protocol including, but not limited to, a Global System of Mobile Communication (GSM), a General Packet Radio Service (GPRS), Code Division Multiple Access (CDMA), Wideband Code Division Multiple Access (WCDMA), Long Term Evolution (LTE), an e-mail, a Short Messaging Service (SMS), and the like.

The memory 720 may be configured to store software programs and modules; and the processor 780 executes software programs and modules stored in the memory 720 to perform various functional applications of the mobile phone and data processing. The memory 720 may mainly include a program storage area and a data storage area, where the program storage area may store an operating system, an application program required by at least one function (such as a sound playing function and an image playing function), and the like; and the storage data area may store data (such as audio data and phone book) created according to the mobile phone. In addition, memory 720 may include a high speed random access memory and may also include a non-volatile memory, such as at least one magnetic disk storage device, flash storage device, or other volatile solid state storage devices.

The input unit 730 may be configured to receive input digit or character information, and generate keyboard signal input related to user setting and function control of the mobile phone. Specifically, the input unit 730 may include a touch panel 731 and another input device 732. The touch panel 731, also referred to as a touchscreen, may collect touch operations on or near the touch panel 731 made by a user (for example, operations on or near the touch panel 731 made by the user using any suitable object or accessory, such as a finger, a stylus, and the like.), and actuate a corresponding connection apparatus according to a preset program. In some embodiments, the touch panel 731 may include two parts: a touch detection apparatus and a touch controller. Specifically, the touch detection apparatus detects a touch orientation of the user, detects a signal brought by the touch operation, and transmits the signal to the touch controller; and the touch controller receives touch information from the touch detection apparatus, converts the same into contact point coordinates, then transmits the same to the processor 780, and can receive commands from the processor 780 and execute the same. In addition, the touch panel 731 may be implemented in various types such as a resistive type, a capacitive type, an infrared ray, and a surface acoustic wave. In addition to the touch panel 731, the input unit 730 may further include the another input device 732. Specifically, the another input device 732 may include, but is not limited to, one or more of a physical keyboard, a function key (such as a volume control key, a switch key, and the like.), a trackball, a mouse, an analog stick, and the like.

The display unit 740 may be configured to display information input by the user or information provided for the user, and various menus of the mobile phone. The display unit 740 may include a display panel 741, which may be configured in forms such as a Liquid Crystal Display (LCD), and an Organic Light-Emitting Diode (OLED). Further, the touch panel 731 may cover the display panel 741; when the touch panel 731 detects the touch operation on or near the same, the touch panel 731 performs transmission to the processor 780 to determine a type of a touch event; and then the processor 780 provides corresponding visual output on the display panel 741 according to the type of the touch event. Although in FIG. 16, the touch panel 731 and the display panel 741 are taken as two separate components to implement input and input functions of the mobile phone, in some embodiments, the touch panel 731 and the display panel 741 may be integrated to implement the input and output functions of the mobile phone.

The mobile phone may further include at least one sensor 750, such as an optical sensor, a motion sensor, and other sensors. Specifically, the optical sensor may include an ambient light sensor and a proximity sensor, where the ambient light sensor may adjust luminance of the display panel 741 according to luminance of ambient light; and the proximity sensor may switch off the display panel 741 and/or performs backlight when the mobile phone is moved to an ear. As one type of motion sensor, an accelerometer sensor may detect the magnitude of an acceleration in various directions (generally three axes), may detect the magnitude and direction of gravity in a stationary state, and may be applied to applications of recognizing mobile phone gestures (such as horizontal and vertical screen switching, relevant games and magnetometer gesture calibration), vibration recognition related functions (such as a pedometer and knocking); and other sensors such as gyroscopes, barometers, hygrometers, thermometers and infrared sensors which may also be provided with the mobile phone, will not be described in detail herein.

The audio circuit 760, a speaker 761 and a microphone 762 may provide an audio interface between the user and the mobile phone. The audio circuit 760 may transmit a received electrical signal converted by the audio data to the speaker 761; and the speaker 761 converts the same into a sound signal for output; and on the other hand, the microphone 762 converts the collected sound signal into an electrical signal, which is received by the audio circuit 760 and converted into audio data; the audio data is output to the processor 780 for processing, and passes the RF circuit 710 for transmission to another cell phone, for example; or the audio data is output to the memory 720 for further processing.

WiFi is a short-range wireless transmission technology; and the mobile phone can help the user send and receive emails, browse web pages, and access streaming media via the WiFi module 770. WiFi provides the user with wireless broadband Internet access. Although the WiFi module 770 is shown in FIG. 16, it is to be understood that the module does not belong to a necessary constitution of the mobile phone, but can be completely omitted as needed without changing the essence of the present disclosure.

The processor 780 is a control center of the mobile phone, uses various interfaces and lines to connect various parts of the whole mobile phone, and performs various functions of the mobile phone and processes data by driving or executing software programs and/or modules stored in the memory 720 and calling data stored in the memory 720, thereby monitoring the mobile phone as a whole. The processor 780 may include one or more processing units; and preferably, the processor 780 may integrate an application processor and a modem processor, where the application processor mainly processes an operating system, a user interface, an application program, and the like; and the modem processor mainly processes wireless communication. It is to be understood that the modem processor described above may not be integrated into the processor 780.

The mobile phone further includes a power supply 790 (for example, a battery) for powering the various components. The power supply may be logically connected to the processor 780 through a power management system, so as to realize functions such as management of charging and discharging and power consumption by the power management system.

Although not shown, the mobile phone may further include a camera, a Bluetooth module, and the like, which will not be described in detail herein.

In this embodiment, the processor 780 included in the terminal device is further configured to execute the positioning method provided by the embodiments of the disclosure.

Figure 17:
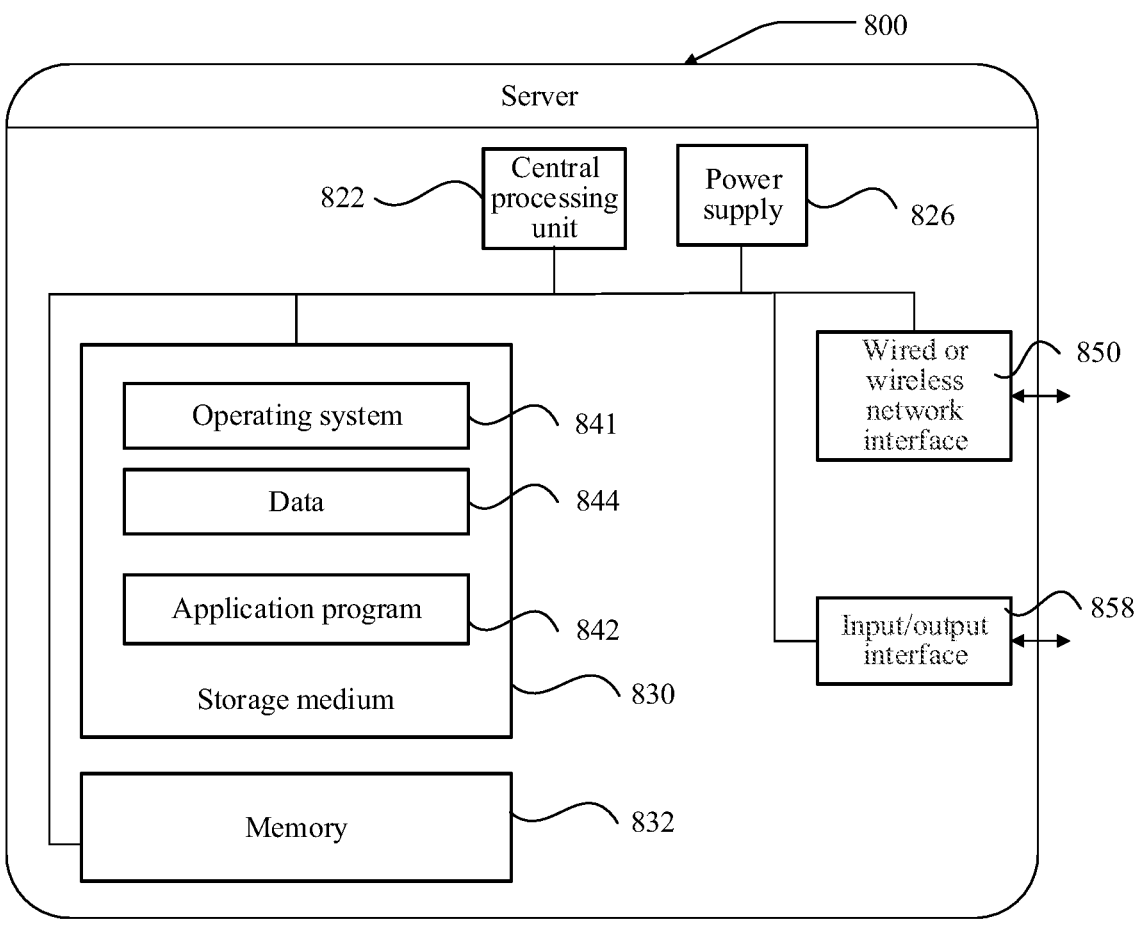
FIG. 17 is a structural diagram of a server provided by an embodiment of the disclosure.

The embodiments of the disclosure further provide a server. FIG. 17 is a structural diagram of a server 800 provided by an embodiment of the disclosure. The server 800 may vary widely due to different configuration or performance, and may include one or more Central Processing Units (CPU) 822 (for example, one or more processors) and a memory 832, and one or more storage media 830 (for example, one or more mass storage devices) for storing applications 842 or data 844. Specifically, the memory 832 and the storage media 830 may be subject to transient storage or persistent storage. A program stored in the storage medium 830 may include one or more modules (not shown in the diagram), each of which may include a series of instruction operations on the server. Further, the central processing unit 822 may be configured to communicate with storage medium 830 and execute a series of instruction operations in the storage medium 830 on the server 800.

The server 800 may further include one or more power supplies 826, one or more wired or wireless network interfaces 850, one or more input/output interfaces 858, and/or one or more operating systems 841, such as Windows Server™, Mac OS X™, Unix™, Linux™ FreeBSD™.

Operations performed by the server in the embodiment described above may be based on the server structure shown in FIG. 17.

The embodiments of the disclosure further provides a computer-readable storage medium for storing a computer program which is configured to perform any one implementation of the positioning method described in each of the above-mentioned embodiments.

It is to be understood by a person ordinarily skilled in the art that: all or part of the operations for implementing the above-mentioned method embodiments may be implemented through hardware associated with program instructions; the above-mentioned program may be stored in a computer-readable storage medium; and when the program is executed, the operations including the above-mentioned method embodiments are executed; and the above-mentioned storage medium may be at least one of the following media: various media which may store program codes, such as a read-only memory (ROM), an RAM, a magnetic disk or an optical disk.

It is to be noted that each embodiment described herein is described in a progressive manner with reference to the same or similar parts throughout the various embodiments, each of which focuses on differences from the other embodiments. In particular, device and system embodiments are basically similar to the method embodiments, and are thus described briefly; and for related parts, reference may be made to partial descriptions in the method embodiments. The described device and system embodiments are merely exemplary. The units described as separate parts may or may not be physically separated; and parts displayed as units may or may not be physical units, namely the parts may be located in one position, or may be distributed on a plurality of network units. Some or all of the modules may be selected according to actual needs to achieve the purpose of the solution of this embodiment. A person ordinarily skilled in the art understands and implements the same without making any inventive effort.

The foregoing descriptions are merely a specific implementation of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A positioning method, performed by at least one processor of a computer device, the method comprising:
   determining a first target lane where a target vehicle is located based on the target vehicle reaching a first position in a target area on a road, the target area comprising the first position and a second position, a first quantity of lanes included at the first position being different from a second quantity of lanes included at the second position, the first position being a start position in the target area in a driving direction of the target vehicle, and the second position being an end position in the target area in the driving direction of the target vehicle;

acquiring vehicle motion data of the target vehicle in the target area and road condition image data, the vehicle motion data representing a displacement situation of the target vehicle in the target area from an angle of own motion of the target vehicle and the road condition image data representing the displacement situation of the target vehicle in the target area from an angle of image changes around the target vehicle;

determining a displacement parameter of the target vehicle in a lateral direction in the target area based on at least gyroscope data of the vehicle motion data, the lateral direction being perpendicular to a travelling direction indicated by a lane corresponding to the second position;

determining a target lane line of the lane corresponding to the second position according to the road condition image data, based on the target vehicle being located in a lane line disappearance area of the target area;

determining image lane change parameters based on an intercept distance parameter between the target lane line and the target vehicle;

determining a second target lane where the target vehicle is located before leaving the second position according to the displacement parameter, the image lane change parameters, and the first target lane;

determining a lane driving identifier corresponding to the second target lane, the lane driving identifier identifying a travelable direction of the second target lane;

acquiring a navigation planning route corresponding to the target vehicle;

updating the navigation planning route according to the lane driving identifier before the target vehicle leaves the second position based on a driving guide direction associated with the target area in the navigation planning route not matching the lane driving identifier; and presenting the update to the navigation planning route to a user of the target vehicle to inform the user of a next driving route before the target vehicle leaves the second position.

2. The positioning method according to claim 1, wherein the determining the second target lane comprises:

determining motion lane change parameters according to the vehicle motion data, the motion lane change parameters indicating at least one of a direction of a changed lane, a quantity of changed lanes, or the target vehicle not changing a lane; and determining a second target lane identifier before the target vehicle leaves the second position according to the motion lane change parameters, the road condition image data and a first target lane identifier corresponding to the first target lane, the second target lane identifier identifying the second target lane.

3. The positioning method according to claim 2, wherein the vehicle motion data further comprises vehicle motion angle data or steering wheel rotation data, and the determining the motion lane change parameters is based on the displacement parameter.

4. The positioning method according to claim 1, wherein the lane change parameters indicate at least one of a direction of a changed lane, a quantity of changed lanes, or the target vehicle not changing a lane, and wherein determining the second target lane comprises determining a second target lane identifier before the target vehicle leaves the second position according to the vehicle motion data, the image lane change parameters and a first target lane identifier corresponding to the first target lane, the second target lane identifier identifying the second target lane.

5. The positioning method according to claim 1, further comprising:

acquiring vehicle position information corresponding to the target vehicle;

acquiring road map data corresponding to the target area according to the vehicle position information; and determining a lane topological relationship in the target area according to the road map data, the lane topological relationship being a topological relationship between a first lane and a second lane, the first lane being a lane corresponding to the start position, and the second lane being a lane corresponding to the end position, wherein the determining the second target lane comprises:

determining a second target lane identifier before the target vehicle leaves a second location according to the vehicle motion data, the road condition image data, the lane topological relationship, and a first target lane identifier corresponding to the first target lane, the second target lane identifier identifying the second target lane.

6. The positioning method according to claim 5, wherein the road map data further comprises a third position, the third position being the end position of a variable lane area in the target area in the driving direction of the target vehicle; and the third position being located between the first position and the second position;

the acquiring vehicle motion data comprises:

acquiring the vehicle motion data of the target vehicle between the first position and the third position, and the road condition image data; and the determining the second target lane comprises:

determining the second target lane identifier before the target vehicle leaves the third position according to the vehicle motion data, the road condition image data and the first target lane identifier corresponding to the first target lane, the second target lane identifier identifying the second target lane.

7. The positioning method according to claim 1, further comprising:

determining a pending lane identifier of a lane where the target vehicle is located at the second position according to the road condition image data; and determining the pending lane identifier as a second target lane identifier based on the lane identified by the pending lane identifier being an edge lane of the lanes included at the second position, the second target lane identifier identifying the second target lane.

8. The positioning method according to claim 7, wherein based on the lane identified by the pending lane identifier not being the edge lane of the lanes included at the second position, the positioning method further comprises:

updating the second target lane identifier to a lane identifier of an adjacent lane to the second target lane based on the second target lane being the edge lane of the lanes included at the second position.

9. A positioning apparatus, comprising:

at least one memory configured to store program code; and at least one processor configured to read the program code and operate as instructed by the program code, the program code comprising:

first determining code configured to cause the at least one processor to determine a first target lane where a target vehicle is located based on the target vehicle reaches a first position in a target area on a road; the target area comprising the first position and a second position; a first quantity of lanes included at the first position being different from a second quantity of lanes included at the second position; the first position being a start position in the target area in a driving direction of the target vehicle; and the second position being an end position in the target area in the driving direction of the target vehicle;

first obtaining code configured to cause the at least one processor to acquire vehicle motion data of the target vehicle in the target area, and road condition image data, the vehicle motion data representing a displacement situation of the target vehicle in the target area from an angle of own motion of the target vehicle and the road condition image data representing the displacement situation of the target vehicle in the target area from an angle of image changes around the target vehicle;

second determining code configured to cause the at least one processor to:

determine a displacement parameter of the target vehicle in a lateral direction in the target area based on at least gyroscope data of the vehicle motion data, the lateral direction being perpendicular to a travelling direction indicated by a lane corresponding to the second position;

determine a target lane line of the lane corresponding to the second position according to the road condition image data, based on the target vehicle being located in a lane line disappearance area of the target area; and determine image lane change parameters based on an intercept distance parameter between the target lane line and the target vehicle;

third determining code configured to cause the at least one processor to determine a second target lane where the target vehicle is located before leaving the second position according to the displacement parameter, the image lane change parameters, and the first target lane;

fourth determining code configured to cause the at least one processor to determine a lane driving identifier corresponding to the second target lane, the lane driving identifier identifying a travelable direction of the second target lane;

fourth acquisition code configured to cause the at least one processor to acquire a navigation planning route corresponding to the target vehicle; and fifth determining code configured to cause the at least one processor to update the navigation planning route according to the lane driving identifier before the target vehicle leaves the second position based on a driving guide direction associated with the target area in the navigation planning route not matching the lane driving identifier, and present the update to the navigation planning route to a user of the target vehicle to inform the user of a next driving route before the target vehicle leaves the second position.

10. The positioning apparatus according to claim 9, wherein the third determining code is further configured to cause the at least one processor to:

determine motion lane change parameters according to the vehicle motion data, the motion lane change parameters indicating at least one of a direction of a changed lane, a quantity of changed lanes, or the target vehicle not changing a lane; and determine a second target lane identifier before the target vehicle leaves the second position according to the motion lane change parameters, the road condition image data and a first target lane identifier corresponding to the first target lane, the second target lane identifier identifying the second target lane.

11. The positioning apparatus according to claim 10, wherein the vehicle motion data further comprises vehicle motion angle data or steering wheel rotation data; and the third determining code is further configured to cause the at least one processor to:

determine the motion lane change parameters according to the displacement parameter.

12. The positioning apparatus according to claim 9, wherein the image lane change parameters indicate at least one of a direction of a changed lane, a quantity of changed lanes, or the target vehicle not changing a lane, and wherein the third determining code is further configured to cause the at least one processor to:

determine a second target lane identifier before the target vehicle leaves the second position according to the vehicle motion data, the image lane change parameters and a first target lane identifier corresponding to the first target lane, the second target lane identifier identifying the second target lane.

13. The positioning apparatus according to claim 9, wherein the program code further comprises:

second acquisition code configured to cause the at least one processor to acquire vehicle position information corresponding to the target vehicle;

third acquisition code configured to cause the at least one processor to acquire road map data corresponding to the target area according to the vehicle position information;

sixth determining code configured to cause the at least one processor to determine a lane topological relationship in the target area according to the road map data, the lane topological relationship comprising being a topological relationship between a first lane and a second lane, the first lane being a lane corresponding to the start position, and the second lane being a lane corresponding to the end position, and the third determining code is further configured to cause the at least one processor to determine a second target lane identifier before the target vehicle leaves a second location according to the vehicle motion data, the road condition image data, the lane topological relationship, and a first target lane identifier corresponding to the first target lane, the second target lane identifier identifying the second target lane.

14. The positioning apparatus according to claim 13, wherein the road map data further comprises a third position, the third position being the end position of a variable lane area in the target area in the driving direction of the target vehicle; and the third position being located between the first position and the second position;

the first obtaining code is further configured to cause the at least one processor to acquire the vehicle motion data of the target vehicle between the first position and the third position, and the road condition image data; and the third determining code is further configured to cause the at least one processor to determine the second target lane identifier before the target vehicle leaves the third position according to the vehicle motion data, the road condition image data and the first target lane identifier corresponding to the first target lane, the second target lane identifier identifying the second target lane.

15. The positioning apparatus according to claim 9, wherein the program code further comprises:

sixth determining code configured to cause the at least one processor to determine a pending lane identifier of a lane where the target vehicle is located at the second position according to the road condition image data; and seventh determining code configured to cause the at least one processor to determine the pending lane identifier as a second target lane identifier based on the lane identified by the pending lane identifier being an edge lane of the lanes included at the second position, the second target lane identifier identifying the second target lane.

16. A non-transitory computer-readable storage medium storing computer program that when executed by at least one processor causes the at least one processor to:

determine a first target lane where a target vehicle is located based on the target vehicle reaching a first position in a target area on a road, the target area comprising the first position and a second position, a first quantity of lanes included at the first position being different from a second quantity of lanes included at the second position, the first position being a start position in the target area in a driving direction of the target vehicle, and the second position being an end position in the target area in the driving direction of the target vehicle;

acquire vehicle motion data of the target vehicle in the target area and road condition image data, the vehicle motion data representing a displacement situation of the target vehicle in the target area from an angle of own motion of the target vehicle and the road condition image data representing the displacement situation of the target vehicle in the target area from an angle of image changes around the target vehicle;

determine a displacement parameter of the target vehicle in a lateral direction in the target area based on at least gyroscope data of the vehicle motion data, the lateral direction being perpendicular to a travelling direction indicated by a lane corresponding to the second position;

determine a target lane line of the lane corresponding to the second position according to the road condition image data, based on the target vehicle being located in a lane line disappearance area of the target area;

determine image lane change parameters based on an intercept distance parameter between the target lane line and the target vehicle;

determine a second target lane where the target vehicle is located before leaving the second position according to the displacement parameter, the image lane change parameters, and the first target lane, determine a lane driving identifier corresponding to the second target lane, the lane driving identifier identifying a travelable direction of the second target lane;

acquire a navigation planning route corresponding to the target vehicle;

update the navigation planning route according to the lane driving identifier before the target vehicle leaves the second position based on a driving guide direction associated with the target area in the navigation planning route not matching the lane driving identifier; and present the update to the navigation planning route to a user of the target vehicle to inform the user of a next driving route before the target vehicle leaves the second position.

* * * * *